(12) United States Patent
Avestruz et al.

(10) Patent No.: US 9,786,423 B2
(45) Date of Patent: Oct. 10, 2017

(54) METHOD AND APPARATUS FOR PRODUCING AN ASYMMETRIC MAGNETIC FIELD

(71) Applicant: Massachusetts Institute of Technology, Cambridge, MA (US)

(72) Inventors: Al-Thaddeus Avestruz, Waltham, MA (US); Arijit Banerjee, Cambridge, MA (US); Arthur Hsu Chen Chang, Irvine, CA (US); Shahriar R. Khushrushahi, Cambridge, MA (US); Steven B. Leeb, Belmont, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 379 days.

(21) Appl. No.: 14/526,004

(22) Filed: Oct. 28, 2014

(65) Prior Publication Data
US 2015/0116887 A1     Apr. 30, 2015

Related U.S. Application Data

(60) Provisional application No. 61/896,269, filed on Oct. 28, 2013.

(51) Int. Cl.
*H01F 7/20* (2006.01)
*H01F 27/28* (2006.01)
(Continued)

(52) U.S. Cl.
CPC ......... *H01F 7/204* (2013.01); *H01F 27/2804* (2013.01); *H02J 5/005* (2013.01);
(Continued)

(58) Field of Classification Search
CPC ................ H01F 7/204; H01F 27/2804; H01F 2027/2809; H02J 5/005; H05B 6/1272;
(Continued)

(56) References Cited

U.S. PATENT DOCUMENTS

| 7,598,646 B2 | 10/2009 | Cleveland | |
| 2004/0109490 A1* | 6/2004 | Asakura | G01J 5/16 374/133 |

(Continued)

OTHER PUBLICATIONS

Sergeant P et al. "Active and passive magnetic shielding for stray field reduction of an induction heater with axial flux", IEE Proceedings: Electrical Power Applications, Institution of Electrical Engineers, GB, vol. 152, No. 5, Sep. 9, 2005, pp. 1359-1364, XP006025158, ISSN: 1350-2352, DOI: 10.1049/IP-EPA:20050005.*

(Continued)

*Primary Examiner* — Thienvu Tran
*Assistant Examiner* — Kevin J Comber
(74) *Attorney, Agent, or Firm* — Wolf, Greenfield & Sacks, P.C.

(57) ABSTRACT

A system for generating an asymmetric magnetic field. The system includes a drive circuit and a stacked winding structure coupled to the drive circuit. The stacked winding structure includes a plurality of winding layers. The plurality of winding layers includes a first winding layer including a first conductive winding having first turns and a second winding layer including a second conductive winding having second turns ion. The plurality of winding layers is arranged to produce a first magnetic field at a first side of the stacked winding structure and a second magnetic field at a second side of the stacked winding structure when the drive circuit electrically drives the plurality of winding layers. The first magnetic field is greater than the second magnetic field.

28 Claims, 37 Drawing Sheets

(51) Int. Cl.
- H02J 5/00 (2016.01)
- H05B 6/36 (2006.01)
- H05B 6/12 (2006.01)
- H05B 6/40 (2006.01)
- H05B 6/44 (2006.01)

(52) U.S. Cl.
CPC ............. *H05B 6/1272* (2013.01); *H05B 6/36* (2013.01); *H05B 6/40* (2013.01); *H05B 6/44* (2013.01); *H01F 2027/2809* (2013.01); *Y02B 40/126* (2013.01)

(58) Field of Classification Search
CPC ... H05B 6/36; H05B 6/40; H05B 6/44; Y02B 40/126
USPC .......................................................... 361/152
See application file for complete search history.

(56) References Cited

U.S. PATENT DOCUMENTS

| 2006/0144321 A1* | 7/2006 | Lu | ......................... C30B 15/203 117/30 |
| 2015/0137624 A1* | 5/2015 | Wu | ...................... H02K 41/031 310/12.05 |

OTHER PUBLICATIONS

International Search Report and Written Opinion mailed Jan. 21, 2015 for Application No. PCT/US2014/062631.
International Preliminary Report and Patentability for Application No. PCT/US2014/062631 mailed May 3, 2016.
Acero et al., Enhancement of induction heating performance by sandwiched planar windings. Electronics Letters. Feb. 2006; 42(4):241-2.
Acero et al., The domestic induction heating appliance: An overview of recent research. Applied Power Electronics Conference and Exposition, Twenty-third Annual IEEE, 2008 ; 651-7.
Avestruz et al., Single-Sided AC Magnetic Fields for Induction Heating. presented at IECON 2013, Vienna, Austria. 5052-7.
Dwari et al., Design of Halbach-Array-Based Permanent-Magnet Motors With High Acceleration. IEEE Transactions on Industrial Electronic. Sep. 2011; 58(9): 3768-75.
Halback, Design of Permanent Multipole Magnets with Oriented Rare-Earth Cobalt Material. Nuclear Instruments and Methods. 1980; 169: 1-10.
Lucia et al., Induction Heating Technology and Its Applications: Past Developments, Current Technology, and Future Challenges. IEEE Transactions on Industrial Electronics. May 2014; 61(5): 2509-20.
Mallinson, One-sided Fluxes—A Magnetic Curiosity? IEEE Transaction on Magnetics. Dec. 1973; MAG-9(4): 678-82.
Moreland, The Induction Range: Its Performance and Its Development Problems. IEEE Transactions on Industry Applications. Jan./Feb. 1973; IA-9(1):81-5.
Oleson, A Review of Magnetic Induction Methods for Hyperthermia Treatment of Cancer. IEEE Transactions on Biomedical Engineering. Jan. 1984; BME-31(1):91-7.
Pham et al., Dynamic Analysis and Control for Resonant Currents in a Zone-Control Induction Heating System. IEEE Transactions on Power Electronics. Mar. 2013; 28(3): 1297-1307.
Sanz et al., Flexible Cooking Zone with 2D Mobile Inductors in Induction Hobs. in EECON 2012—38th Annual Conference on IEEE Industrial Electronics Society. 2012; 3262-7.
Sergeant et al., Analysis of perforated magnetic shields for electric power applications. IET Electric Power Applications. 2009; 3:123-132.
Sergeant et al., Magnetic Shielding of Levitation Melting Devices. IEEE Transactions on Magnetics. Feb. 2010; 46 (2):686-9.
Sergeant et al., Optimizing a transformer driven active magnetic shield in induction heating. Compel: The International Journal for Computation and Mathematics in Electrical and Electronic Engineering. 2005; 24(4):1241-57.
Sergeant et al., Optimizing active and passive magnetic shields in induction heating by a genetic algorithm. IEEE Transactions on Magnetics. Nov. 2003; 39(6):3486-3496.
Sergeant et al., Passive and active electromagnetic shielding of induction heaters. IEEE Transactions on Magnetics. Mar. 2004; 40(2): 675-678.
Sergeant et al., Thermal analysis of magnetic shields for induction heating. IET Electric Power Applications. 2009; 3(6): 543-50.
Shute et al., One-Sided Fluxes in Elliptical Cylinders. IEEE Transactions on Magnetics. Jul. 2001; 37(4): 2966-9.
Shute et al., One-Sided Fluxes in Planar, Cylindrical, and Spherical Magnetized Structures. IEEE Transactions on Magnetics. Mar. 2000; 36(2): 440-51.
Souley et al., Optimization of the settings of multiphase induction heating system. IEEE Industry Applications Society Annual Meeting (IAS). Oct. 2012;1-6.
Stauffer et al., Practical Induction Heating Coil Designs for Clinical Hyperthermia with Ferromagnetic Implants. IEEE Transactions on Biomedical Engineering.Jan. 1994; 41(1): 17-28.
Zhou et al., Design and Analysis of a Novel Ironless Trapezoid Winding Array with Single-Sided and Well Sinusoidal Magnetic Field. 14th Biennial IEEE Conference on Electromagnetic Field Computation (CEFC). 2010;1.

\* cited by examiner

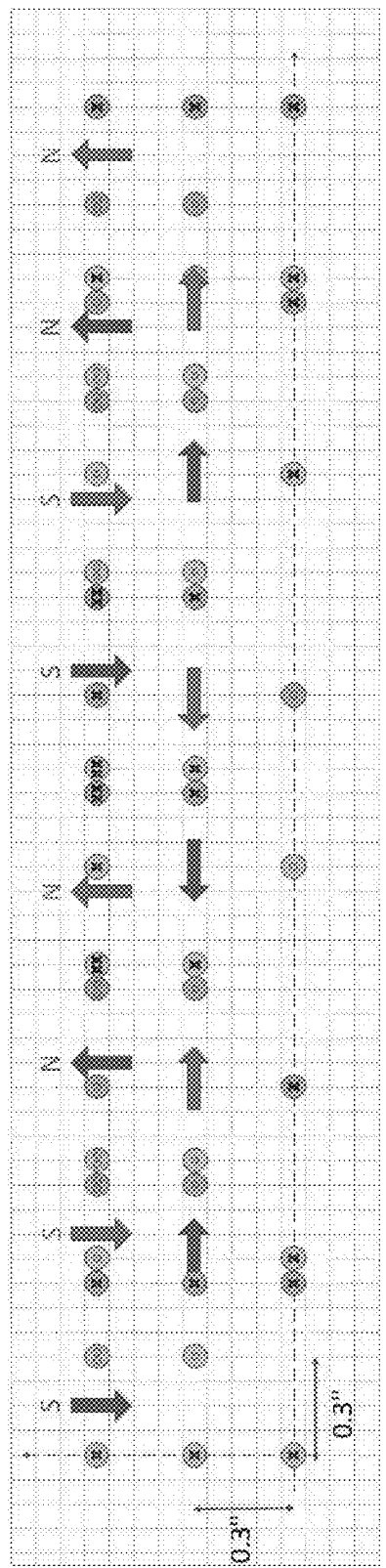

METHOD AND APPARATUS FOR PRODUCING AN ASYMMETRIC MAGNETIC FIELD

CROSS-REFERENCE TO RELATED APPLICATIONS

This application claims priority to U.S. provisional application Ser. No. 61/896,269, titled "Method and Apparatus for Uniform Single-Sided Induction Heating," filed Oct. 28, 2013, which is hereby incorporated by reference in its entirety.

BACKGROUND

1. Technical Field

The techniques described herein relate to a method and apparatus for producing an asymmetric magnetic field by electrically driving a stacked winding structure.

2. Discussion of the Related Art

Induction heating is widely used for industrial, medical, and consumer applications. Cooktop induction heaters often have circular, planar, multi-turn coils excited with resonant power electronic circuits operating in the range of tens to hundreds of kHz. This arrangement produces considerable stray magnetic fields at the bottom of the coil and also results in non-uniform heating along the surface of the target.

SUMMARY

Some embodiments relate to a system for generating an asymmetric magnetic field. The system includes a drive circuit and a stacked winding structure coupled to the drive circuit. The stacked winding structure includes a plurality of winding layers. The plurality of winding layers includes a first winding layer including a first conductive winding having first turns and a second winding layer including a second conductive winding having second turns. The plurality of winding layers is arranged to produce a first magnetic field at a first side of the stacked winding structure and a second magnetic field at a second side of the stacked winding structure when the drive circuit electrically drives the plurality of winding layers. The first magnetic field is greater than the second magnetic field.

Some embodiments relate to a stacked winding structure coupled to the drive circuit. The stacked winding structure includes a plurality of winding layers. The plurality of winding layers includes a first winding layer including a first conductive winding having first turns and a second winding layer including a second conductive winding having second turns. The plurality of winding layers is arranged to produce a first magnetic field at a first side of the stacked winding structure and a second magnetic field at a second side of the stacked winding structure when a current is provided to the plurality of winding layers. The first magnetic field is greater than the second magnetic field.

Some embodiments relate to a method of producing an asymmetric magnetic field using a stacked winding structure that includes a plurality of winding layers. The plurality of winding layers includes a first winding layer including a first conductive winding having first turns and a second winding layer including a second conductive winding having second turns. The plurality of winding layers is arranged to produce a first magnetic field at a first side of the stacked winding structure and a second magnetic field at a second side of the stacked winding structure. The first magnetic field is greater than the second magnetic field. The method includes driving a current through the plurality of winding layers to magnetically transfer energy to the first side of the stacked winding structure.

The foregoing summary is provided by way of illustration and is not intended to be limiting.

BRIEF DESCRIPTION OF DRAWINGS

In the drawings, each identical or nearly identical component that is illustrated in various figures is represented by a like reference character. For purposes of clarity, not every component may be labeled in every drawing. The drawings are not necessarily drawn to scale, with emphasis instead being placed on illustrating various aspects of the techniques and devices described herein.

FIG. 6C shows a superposition of the phases of FIGS. 6A and 6B to form a three-layer, two-phase Halbach arrangement.

DETAILED DESCRIPTION

Figure 1A:
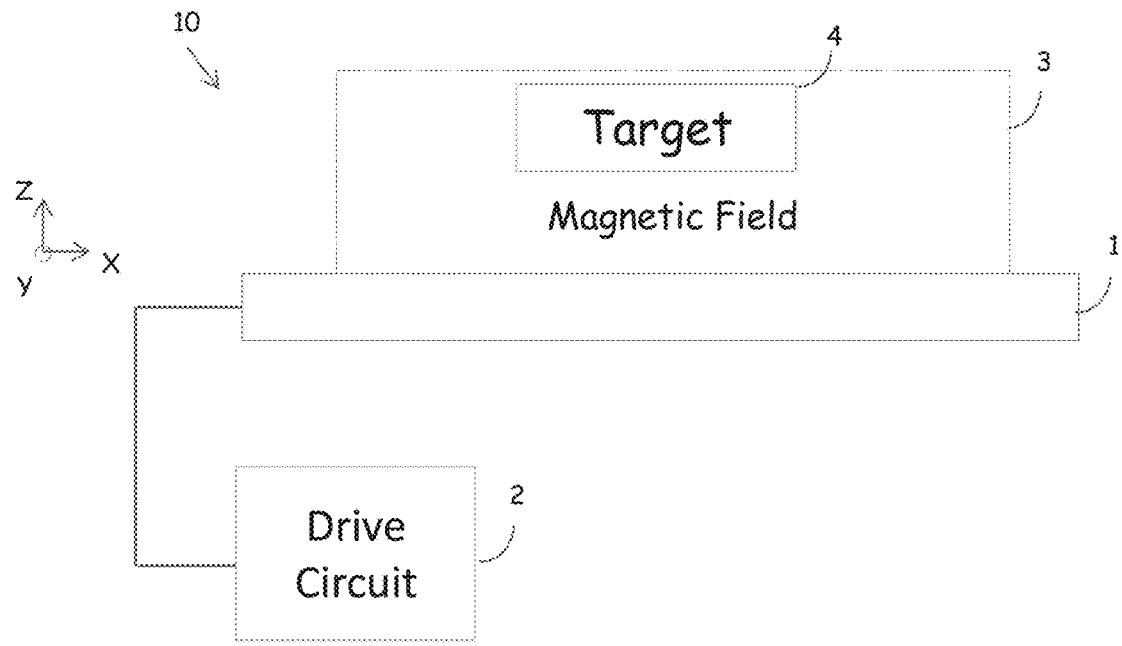
FIG. 1A shows a diagram of a magnetic field generation system.

The present inventors have recognized and appreciated that the capability of producing an asymmetric magnetic field can be advantageous in a variety of applications. For example, in induction heating cooktop applications it would be desirable to produce a magnetic field above the surface of the cooktop without producing significant stray magnetic fields below or to the sides of the cooktop, thereby preferentially transferring magnetic energy to the target (e.g., cookware). One advantage of reducing stray magnetic fields is an increase in the efficiency of energy transfer, as magnetic energy can be directed to the target object while minimizing the magnetic energy that is dissipated in other areas. For example, in induction heating cooktop applications, producing an asymmetric magnetic field that concentrates magnetic energy above the surface of the cooktop can increase heating efficiency.

The inventors have recognized that mitigation of stray magnetic fields may be partially addressed using ferrite planes or optimized shielding. However, such solutions may increase the cost, weight, and/or size of the device, increase the complexity of the control, and/or may lead to susceptibility to mechanical failures, as ferrite cores can be brittle.

Some embodiments relate to methods and apparatus for producing an asymmetric magnetic field using a stacked winding structure having conductive windings arranged in a pattern such that the windings produce an asymmetric magnetic field with respect to the stacked winding structure when driven by an electric current. The winding(s) may be arranged to cancel a magnetic field below the stacked structure, while concentrating magnetic energy above the stacked winding structure. Accordingly, energy may be magnetically transferred from the windings to a target on one side of the stacked winding structure, while reducing magnetic energy transfer to regions on another side of the stacked winding structure.

Such a stacked winding structure may include a plurality of stacked layers of windings. For example, in some embodiments, the stacked winding structure may include two layers of windings, three layers of windings, or a greater number of windings, arranged in/on respective surfaces of the stacked winding structure. Examples of suitable winding patterns for producing asymmetric magnetic fields include Halbach arrays and Mallinson arrays, more detailed examples of which are described below. In some embodiments, when the windings are driven with a suitable alternating current, a larger magnetic energy may be transferred to a first side (e.g., the top, or front side) of the stacked winding structure than is transferred to a second side (e.g., the bottom, or back side) of the stacked winding structure, due to larger magnetic fields being produced on the first side of the stacked winding structure, in aggregate. The ratio of the magnetic energy transferred to the first side to the ratio of the magnetic energy transferred to the second side may be greater than 1, 5 or more, or 10 or more, by way of example and not limitation. In some embodiments, the windings of the winding structure may be arranged such that a magnetic field on the second side (e.g., the bottom, or back side) of the stacked winding structure is substantially canceled. In some embodiments, the use of a suitable winding arrangement can eliminate the need for ferromagnetic shielding materials (e.g., ferrites) or other shielding to reduce stray magnetic fields, thus enabling limiting the size, weight, cost and/or susceptibility to mechanical failures. However, the techniques described herein are not limited in this respect, as some embodiments may include shielding (e.g., ferromagnetic shielding materials, such as ferrites) if desired for a particular application.

FIG. 1A shows a diagram of a magnetic field generation system 10 that includes a stacked winding structure 1 driven by a drive circuit 2. The stacked winding structure 1 has windings arranged to produce an asymmetric magnetic field with respect to the stacked winding structure 1, such that higher magnetic energy is transferred above the stacked winding structure 1 (i.e., for coordinates above the stacked winding structure 1 with positive values of Z) than is transferred below the stacked winding structure 1 (i.e., for coordinates below the stacked winding structure 1 with negative values of Z). When the drive circuit 2 drives a current through the windings of the stacked winding structure 1, a magnetic field 3 is produced above the stacked winding structure 1. In some embodiments, the magnetic field produced above the stacked winding structure 1 may be significantly greater than the magnetic field produced below the stacked winding structure 1. In some embodiments, the magnetic field produced below the stacked winding structure 1 may be negligible.

Figure 1B:
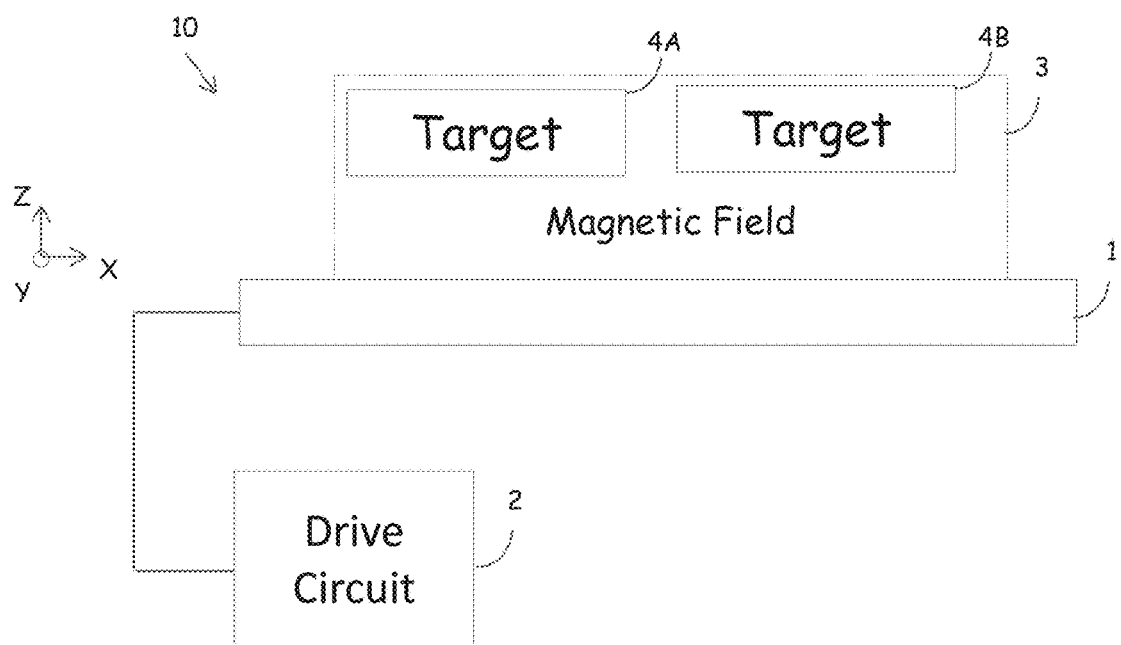
FIG. 1B shows a diagram of a magnetic field generation system directing fields to a plurality of targets.

Magnetic field generation system 10 may direct the magnetic field 3 to any number of targets 4. FIG. 1B illustrates directing magnetic field 3 to a plurality of targets 4A and 4B.

As mentioned above, producing an asymmetric magnetic field that concentrates magnetic energy above the stacked winding structure 1 enables preferentially transferring magnetic energy to a target 4 located above the stacked winding structure 1, and can improve the efficiency with which magnetic energy is delivered to the target 4.

Magnetic field generation system 10 may be advantageously used for any of a variety of applications, such as induction heating, wireless power transfer, plasma reactors, and magnetic resonance imaging, by way of example. Applications to induction heating may include induction cooktops, medical applications, industrial applications such as processing of metals, food processing, and tool and machine manufacturing.

In an induction heating cooktop application, the stacked winding structure 1 may be at or near the surface of the cooktop, and the target 4 may be cookware (e.g., a pot or a pan) desired to be heated, for example.

Applications to wireless power transfer may include chargers for portable electronic devices having energy storage (e.g., a battery), such as chargers for portable computing devices including mobile phones, tablet computers, and laptop computers, by way of example. In a wireless power transfer application, the target 4 may be a conductor (e.g., a coil) designed to receive energy through electromagnetic energy transfer (e.g., inductive energy transfer), for example. Applications to wireless power transfer may also include non-contact chargers or other energy sources for transportation, industrial, and medical applications.

In some embodiments, the stacked winding structure 1 has windings arranged in two or more layers in a pattern that produces an asymmetric magnetic field with respect to the stacked winding structure 1. Examples of winding arrangement geometries suitable for producing an asymmetric magnetic field using windings arranged in two or more layers are Halbach arrays and Mallinson arrays, some examples of which are described below.

Figure 2:
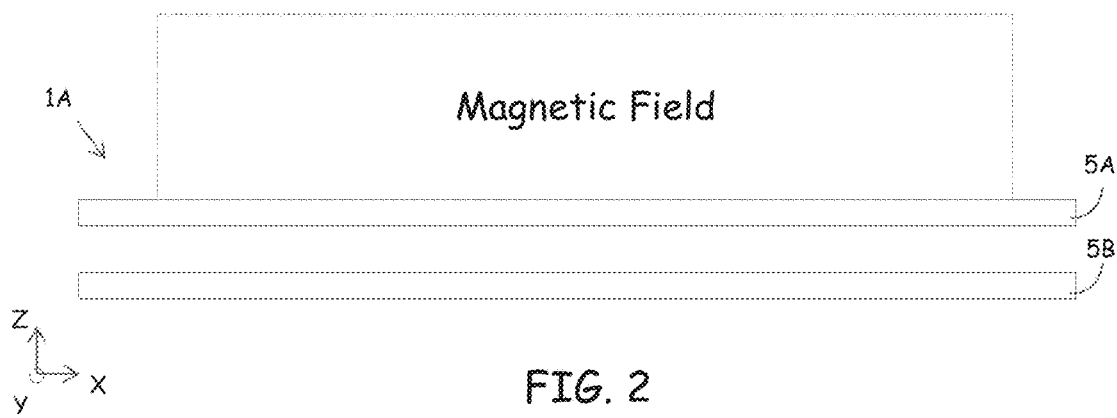
FIG. 2 shows an example of a stacked winding structure that has two layers of windings.
Figure 3:
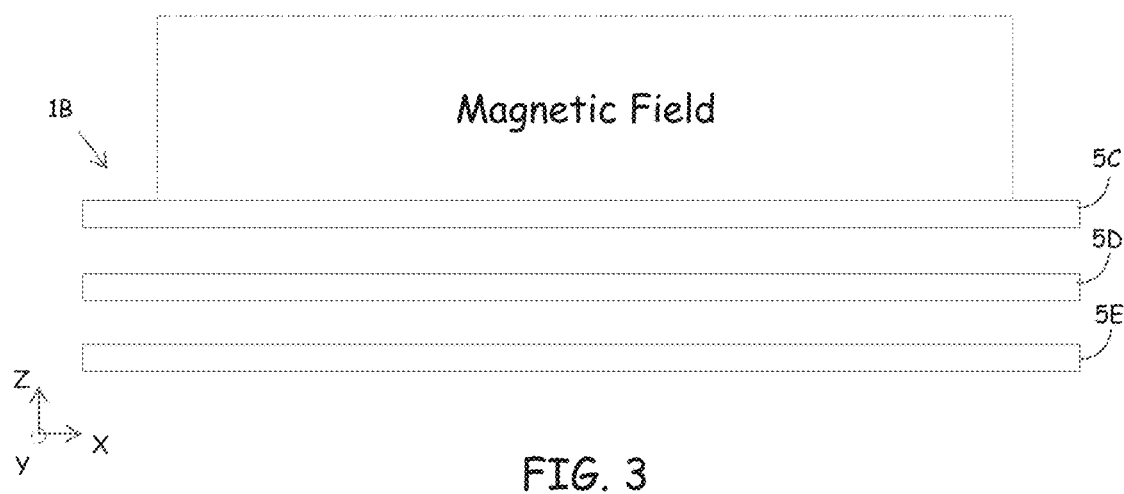
FIG. 3 shows an example of a stacked winding structure that has three layers of windings.

FIG. 2 shows an example of a stacked winding structure 1A that has two layers of windings 5A and 5B. FIG. 3 shows an example of a stacked winding structure 1B that has three layers of windings 5C, 5D and 5E. However, the techniques described herein are not limited to a stacked winding structure 1 having two layers of windings or three layers of windings, as any number of two or more layers of windings may be included in a stacked winding structure 1.

Figure 4A:
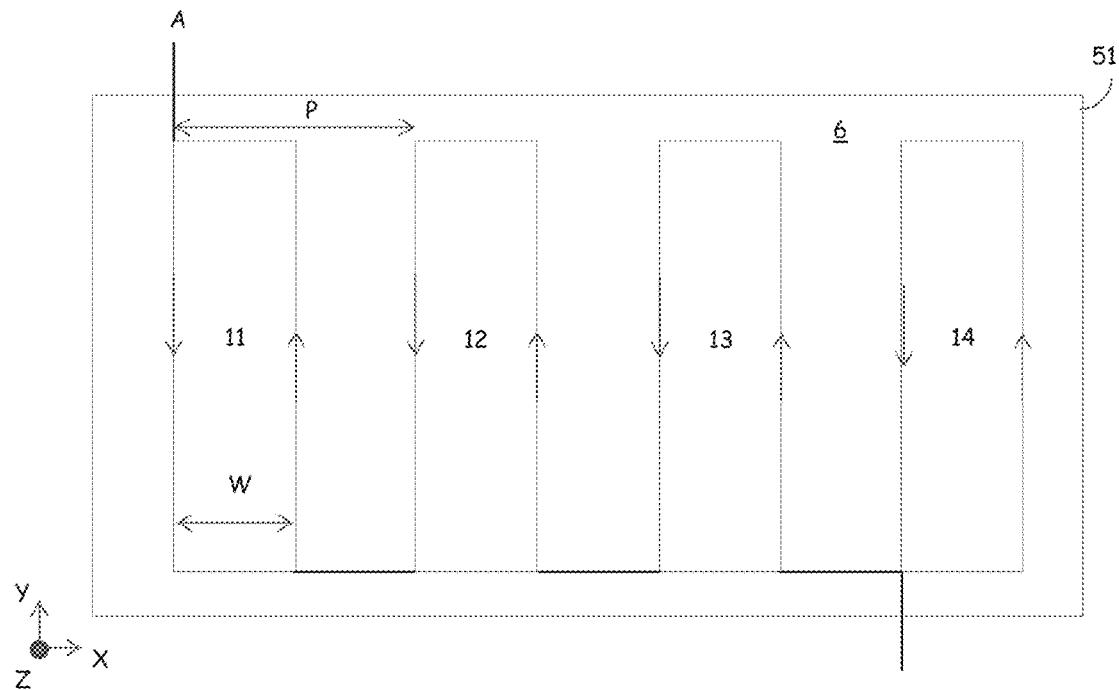
FIG. 4A shows a top view of an example of a winding layer according to some embodiments in which a single winding is formed in a winding layer.
Figure 4B:
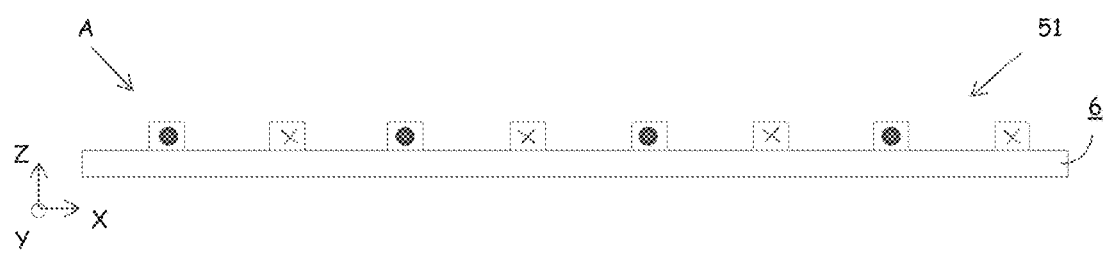
FIG. 4B shows a side view of winding layer of FIG. 4A.

FIG. 4A schematically shows a top view of an example of a winding layer 51, according to some embodiments in which a single winding is formed in a winding layer 5. FIG. 4B shows a side view of winding layer 51 along the Y dimension. As shown in FIGS. 4A and 4B, a conductive winding A may be formed on/in a substrate 6. Substrate 6 may provide mechanical support for the conductive winding A.

FIGS. 4A and 4B show the conductive winding A includes a number of turns within the winding layer 51, arranged in a first group of turns 11, a second group of turns 12, a third group of turns 13, and a fourth group of turns 14. Although four groups of turns 11-14 are illustrated in FIG. 4A, this is merely by way of illustration, as any suitable number of groups of turns may be used. The groups of turns 11-14 are spaced apart from one another at intervals P along the X dimension. As shown in FIGS. 4A and 4B, the groups of turns 11-14 may be arranged periodically along the X dimension with a period P. Each group of turns 11-14 have any suitable number of turns greater than or equal to one. In some embodiments, each group of turns 11-14 may have the same number of turns. As illustrated in FIG. 4A, conductive winding A is "wound" in the sense that it extends from the top left side of substrate 6 to the bottom left side of substrate 6, across to the right by a distance W (the width of a turn), up to the top side of the substrate 6, across to the left by a distance W, thereby forming a first turn of the group of turns 11. Depending on the number of turns in group 11, additional turn(s) may be formed in group 11 in a similar configuration. The conductive winding then extends across to group of turns 12 where one or more turns are formed, etc. The arrows in FIG. 4A and the dots and Xs in FIG. 4B illustrate the direction of current flow through the winding A, as will be understood by those of ordinary skill in the art.

Substrate 6 may be formed of any suitable material, such as insulating material, for example. In some embodiments, the substrate 6 may include a board, such as a printed circuit board. However, the techniques described herein are not limited in this respect, as substrate 6 may be formed of any suitable material. Further, substrate 6 may have any suitable shape, such as a planar shape, as shown in FIGS. 4A and 4B, or another shape such as a cylindrical shape, a spherical shape, or another shape. In some embodiments, substrate 6 may be a flexible substrate (e.g., formed of flexible polymer or any other suitable material) that provides a flexible supporting surface. Using a flexible substrate for the winding layers of the stacked winding structure 1 can enable various applications in which flexibility and/or portability of the stacked winding structure is advantageous. For example, in some embodiments a flexible (e.g., folding) portable cooktop or wireless charging apparatus can be produced, which may be advantageous for applications such as backpacking, military use, etc.

A conductive winding formed in/on the substrate 6, such as conductive winding A, may include any suitable type of conductor, such as wire (e.g., Litz wire), a printed conductor, etc. Since the conductor may be formed of printed conductor, reference herein to a "winding" or "wound" conductor does not imply the conductor is a wire, as those of ordinary skill in the art will appreciate that windings may be formed on a substrate using a printed conductor. The term "printed conductor" is intended to refer to conductors formed by any suitable method, such as additive manufacturing techniques in which the conductor is deposited on the substrate or subtractive manufacturing techniques in which the conductor is printed by removal (e.g., etching) of conductive regions adjacent the conductor, which remains on the substrate 6 following the removal step. The conductive winding may be formed of any suitable conductive material, examples of which include metals such as copper, aluminum, etc. The terms "conductor," "conductive" and "conductive winding" as used herein are each intended to encompass any materials capable of carrying electrical current, including conductors, doped semiconductor, or superconductors, by way of example and not limitation.

Although in some embodiments a winding layer may include only a single winding, the inventors have appreciated that a single conductive winding A may produce a magnetic field above the stacked winding structure 1 that varies along the X dimension. The inventors have appreciated that it may be desirable in some applications to produce a more uniform magnetic field. In some embodiments, a more uniform magnetic field may be produced by including a second conductive winding B in one or more winding layers.

Figure 5A:
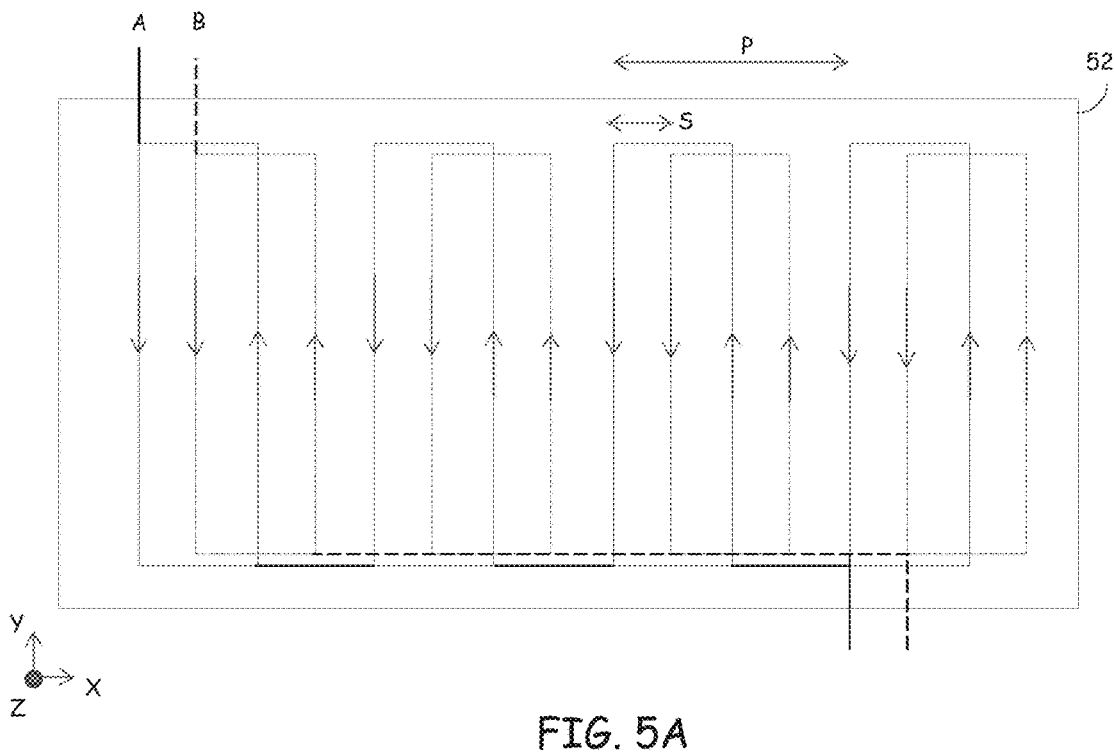
FIG. 5A shows a top view of an example of a winding layer according to some embodiments in which a plurality of windings are formed in a winding layer.
Figure 5B:
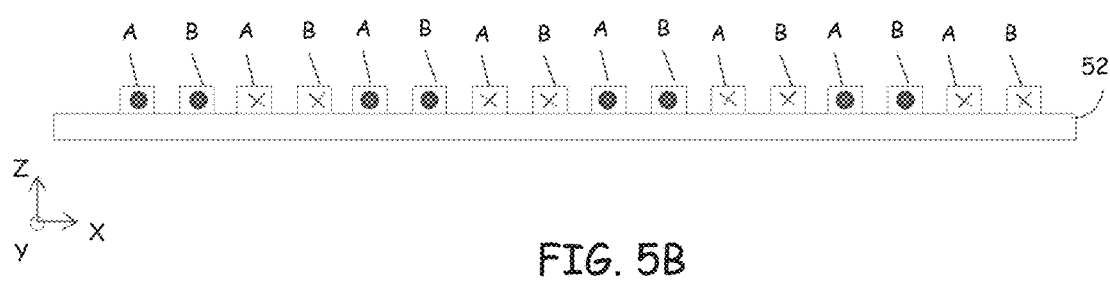
FIG. 5B shows a side view of winding layer of FIG. 5A.

FIG. 5A schematically shows a top view of an example of a winding layer 52, according to some embodiments in which a plurality of windings are formed in a winding layer. FIG. 5B shows a side view of winding layer 52 along the Y dimension. As shown in FIGS. 5A and 5B, conductive windings A and B may be formed on/in a substrate 6. As with conductive winding A, conductive winding B may include a number of turns within the winding layer 51, with groups of turns being spaced apart from one another at intervals along the X dimension. Conductive winding B may have the same configuration as conductive winding A, in some embodiments, with the exception that conductive winding B is displaced with respect to conductive winding A along the X dimension by a spacing S. In this sense, conductive windings A and B have different spatial phases along the X dimension. In some embodiments, the second conductive winding B adds a spatial component to the magnetic field, that, when superposed with the magnetic field produced by the conductive winding A, produces a more uniform magnetic field 3. Producing a more uniform magnetic field can be advantageous in various applications such as inductive heating, for example, in which more uniform heating of the target 4 can be performed when the magnetic field 3 is more uniform in the X and Y dimensions. A multiphase winding structure (i.e., a plurality of conductive windings A and B with different spatial phases) enables producing a traveling magnetic field in the target 4, which in induction heating applications can produce a uniform heating profile.

In some embodiments, the spacing S between conductive winding A and B may be 90° (¼ of the period P) so that conductive windings A and B are spatially orthogonal, thereby reducing or eliminating magnetic cross-coupling between windings A and B. In some embodiments, additional windings may be included and may be spaced in such a way that the windings are spatially orthogonal. For example, if three windings are included in a winding layer, the windings may be spaced apart from each other by 60° (⅙ of the period P).

The inventors have appreciated that even if the conductive windings A and B are spaced such that they are spatially orthogonal, there may be some cross-coupling between conductive windings A and B nonetheless, due to non-ideal positioning of the conductors and/or the magnetic fields they produce. To reduce the magnetic coupling between conductive windings A and B, in some embodiments conductive windings A and B may be driven by alternating current of different frequencies. The two frequencies may be different enough from one another such that cross-coupling is sufficiently reduced. In some embodiments, the waveforms and frequencies with which windings A and B are driven may be selected to avoid any overlapping frequencies between the frequencies at which the windings are driven and their harmonics. In some embodiments, the frequencies at which windings A and B are driven may be relative primes, such that they share no common positive factors except 1. Driving two phases at such frequencies can reduce the deleterious effects on control of magnetic coupling between the windings. In some embodiments, the windings may be configured to resonate at different resonant frequencies, and may be driven at their resonant frequencies, as discussed further below.

A winding pattern as schematically illustrated with respect to winding layer 51 or 52 may be used for any of the winding layers shown in FIGS. 2 and 3, including any one or more of winding layers 5A-5E, though specific aspects of the winding layers 5A-5E such as the number of turns, the spacing between the turns, etc. may be different for each of the winding layers, to produce an asymmetric magnetic field.

Specific examples of conductor arrangements for the two-layer stacked winding structure 1A of FIG. 2 and the three-layer stacked winding structure 1B of FIG. 3 will be described below. The techniques described herein are not limited as to the particular winding configurations described herein, as those of ordinary skill in the art will appreciate that many different winding designs can approximate a Halbach arrangement, or another arrangement that produces an asymmetric magnetic field. The principles for producing suitable Halbach approximations will be described.

EXAMPLE 1

Three-Layer Stacked Winding Structure

The inventors have developed and demonstrated a multi-phase, multi-resonant winding structure using a Halbach winding arrangement that produces a negligible magnetic field at the bottom of the stacked winding structure. Such an apparatus may be used for induction heating or other applications, as mentioned above. Orthogonal Halbach windings are superimposed to create a multiphase Halbach arrangement, enabling a translating magnetic field at the target. Design, analysis, and a prototype will be described. Traditionally, Halbach configurations have been used to generate dc magnetic fields, but it is demonstrated that ac fields can be generated with asymmetric characteristics.

By active control of power in the windings with correct excitation current in the two phases, a uniform heating profile on the target can be achieved. A 4.2"×5" prototype has been demonstrated along with associated resonant drive circuits.

Two Phase Halbach Winding

Figure 6A:
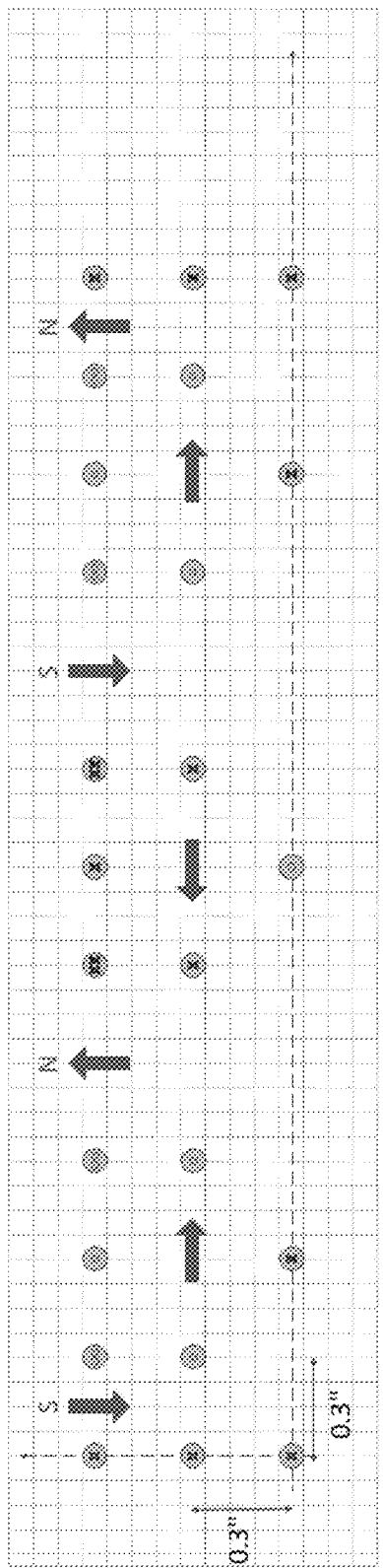
FIG. 6A shows a first phase of an equivalent Halbach arrangement using excitation coils built using three layers of windings.
Figure 6B:
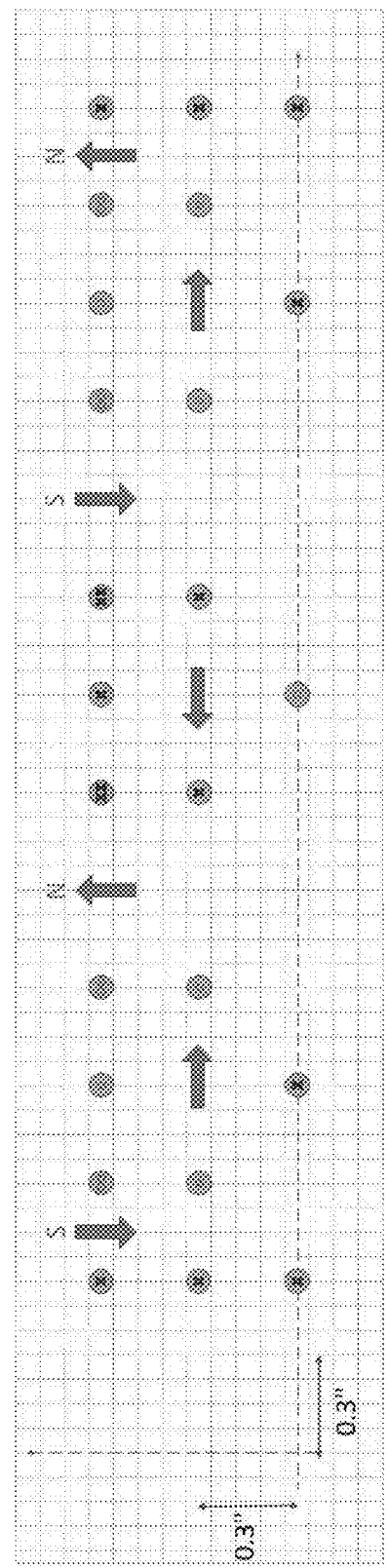
FIG. 6B shows a second phase of an equivalent Halbach arrangement using excitation coils built using three layers of windings.

FIG. 6A shows an equivalent Halbach arrangement using excitation coils built using three layers of windings. The phase shown in FIG. 6A will be termed the "left phase". The field directions are shown with arrows. In the Halbach arrangement, the magnetic field has a sinusoidal variation on the plane of the array while falling off exponentially from the top surface, and is zero below. The magnetic flux density of the left phase at a point z above and x along the Halbach surface with thickness d can be shown as, $$B_L = \mu_0 \alpha k N (1-e^{-kd}) e^{-kz} I_L \cos kx \quad (1)$$

where $k=2\pi/\lambda$, is the radian reciprocal of the array wavelength or pole pitch, N is the equivalent number of turns, $I_L$ is the current excitation in the left phase, and $\alpha$ is a geometric factor. FIG. 6A shows a 4 pole structure. The end poles carry only the half of the flux compared to the middle poles and may have fringing effects. A second phase (termed the "right phase") can be constructed as shown in FIG. 6B, in which the coils are displaced by 90° in space with respect to the left phase, as in the example of FIG. 5A. Both phases can be superposed to form a three-layer, two-phase Halbach arrangement, as shown in FIG. 6C.

Figure 7A:
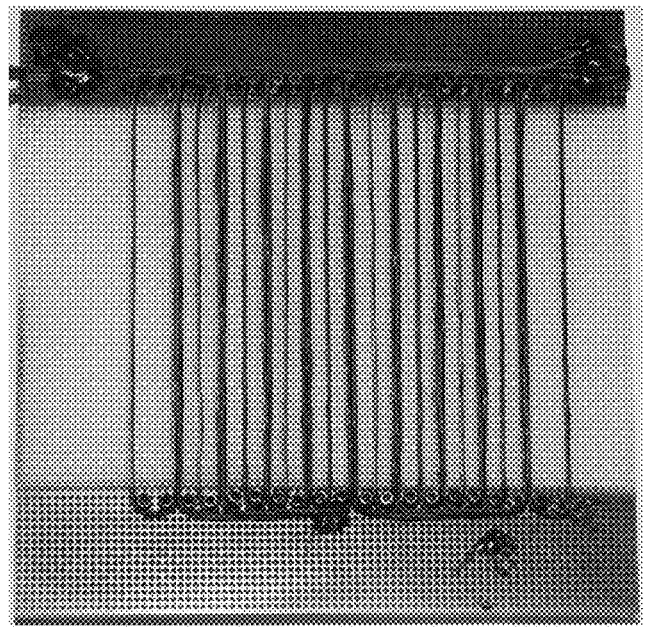
FIG. 7A shows a prototype of a winding structure.
Figure 7B:
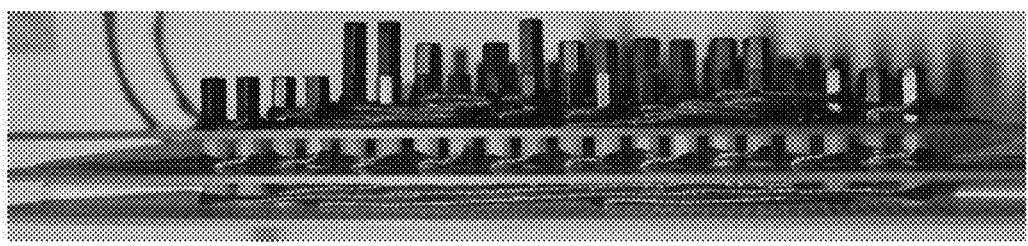
FIG. 7B shows a side view of the winding structure of FIG. 7A.

The winding structure is built on a G-10 board, as shown in FIG. 7A. The three-layer two-phase complete winding along with the end-windings is shown in FIG. 7B. The magnetic flux density of the right phase at a point z above and x along the Halbach surface with thickness d can be similarly written as, $$B_R = \mu_0 \alpha k N (1-e^{-kd}) e^{-kz} I_R \sin(kx) \quad (2)$$

Assuming the windings are identical and the two phase currents are individually controlled, the total magnetic flux density can be written by the superposition principle as $$B_{Total} = \mu_0 \alpha k N (1-e^{-kd}) e^{-kz} [-I_R \sin(kx) + I_L \cos(kx)] \quad (3)$$

In an induction heating context, the changing magnetic field due to time-varying current excitations as computed above will result in eddy currents in the target 4, thereby causing power dissipation and heating of the target. The power dissipated on the target 4 is proportional to the square of the flux density. Thus, the power delivered to the coil can be equivalently written as $$P_{Target} = K[I_R^2 \sin^2(kx) + I_L^2 \cos^2(kx) - I_R I_L \sin(kx)\cos(kx)] \quad (4)$$

Equation (4) can be further simplified as $$P_{Target} = \frac{K}{2}[I_R^2(1-\cos(2kx)) + I_L^2(1+\cos(2kx)) - 2I_L I_R \sin(2kx)] \quad (5)$$

The time averaged power dissipation on the target can be written as, assuming the current excitations are sinusoidal and equal in magnitude, $$\langle P_{Target}\rangle = \frac{K'}{2}[(1-\cos(2kx)) + (1+\cos(2kx)) - 2\langle I_L I_R\rangle \sin(2kx)] \quad (6)$$

or, $$\langle P_{Target}\rangle = K'[1 - \langle I_L I_R\rangle \sin(2kx)] \quad (7)$$

Thus the average power dissipated in the target can be made uniform i.e., without any spatial dependency in the X and Y dimensions, if the time averaged product of the two phase currents can be forced to zero.

Power Circuit for Two Phase Excitation Tuned at Multi-Resonant Frequencies

Figure 8A:
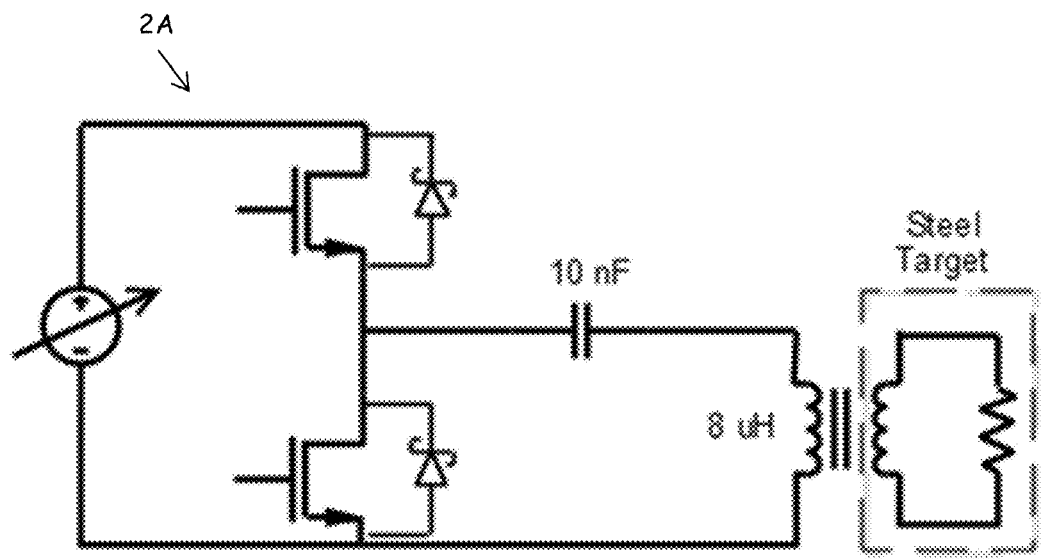
FIG. 8A shows a series resonant drive circuit that may be used to excite the currents in one or more windings with a single phase.
Figure 8B:
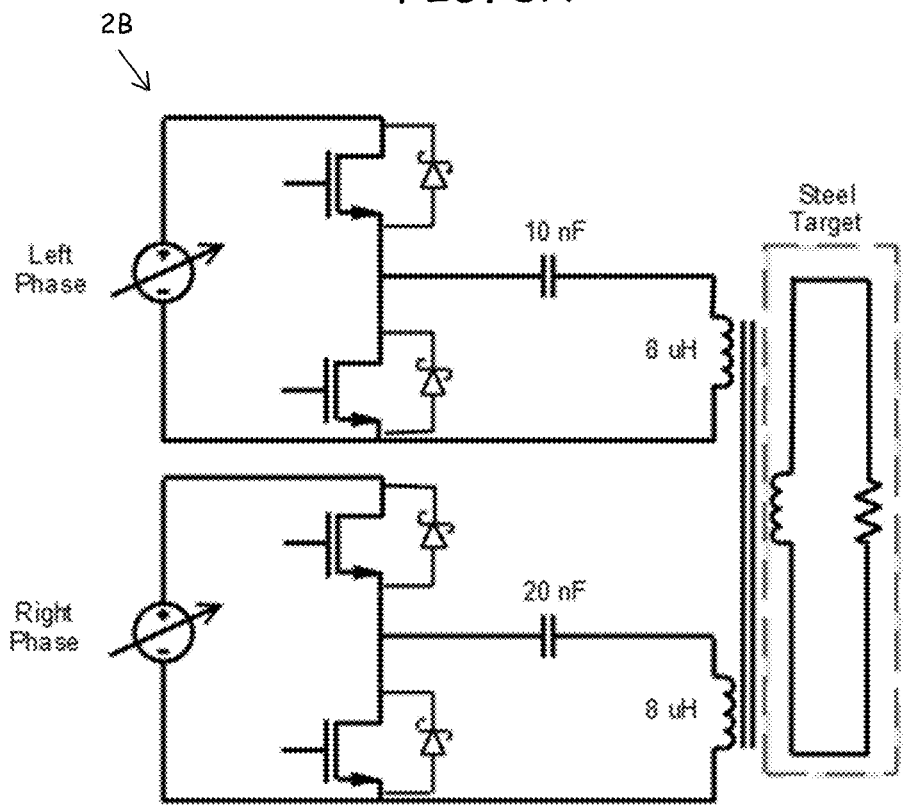
FIG. 8B shows a series resonant drive circuit including two series resonant voltage source inverters that may be used to excite the currents in two phases of windings.

Examples of drive circuits 2 (FIG. 1A) are shown in FIGS. 8A and 8B. A series resonant drive circuit 2A that may be used to excite the currents in one or more windings with a single phase is shown in FIG. 8A. Series resonant drive circuit 2A includes a series resonant voltage source inverter for providing sinusoidal current excitation. A series resonant drive circuit 2B including two series resonant voltage source inverters may be used to excite the currents in two phases of windings is shown in FIG. 8B.

Excitations in a multiphase system may include delivering currents of the same frequency with a phase shift of 90° in the time domain to produce a traveling magnetic field. Though the traditional approach can cancel the time averaged components of the product of the two phase currents from equation (7), it may be difficult to operate both phases at resonance while maintaining a phase shift of 90° due to non-zero mutual coupling between the two phases in a practical system. Therefore, an alternative solution is described to excite the two phases at two different resonant frequencies. This approach also leads to the cancellation of the spatial dependency term in (7).

Figure 9A:
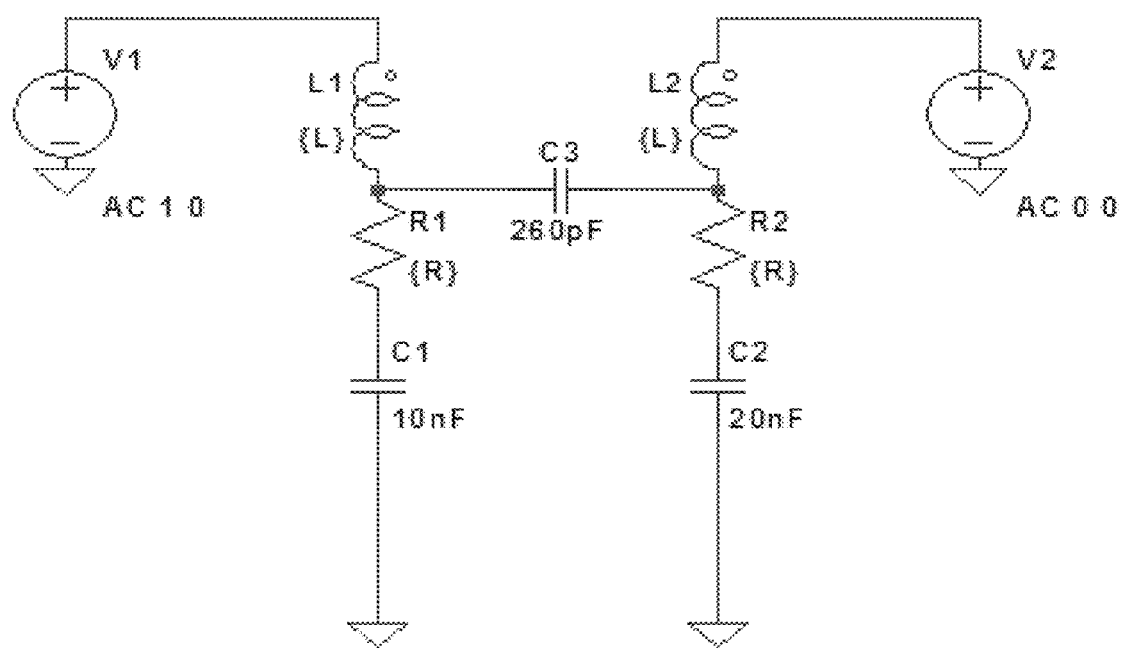
FIG. 9A shows a model of the drive circuit of FIG. 8B.
Figure 9B:
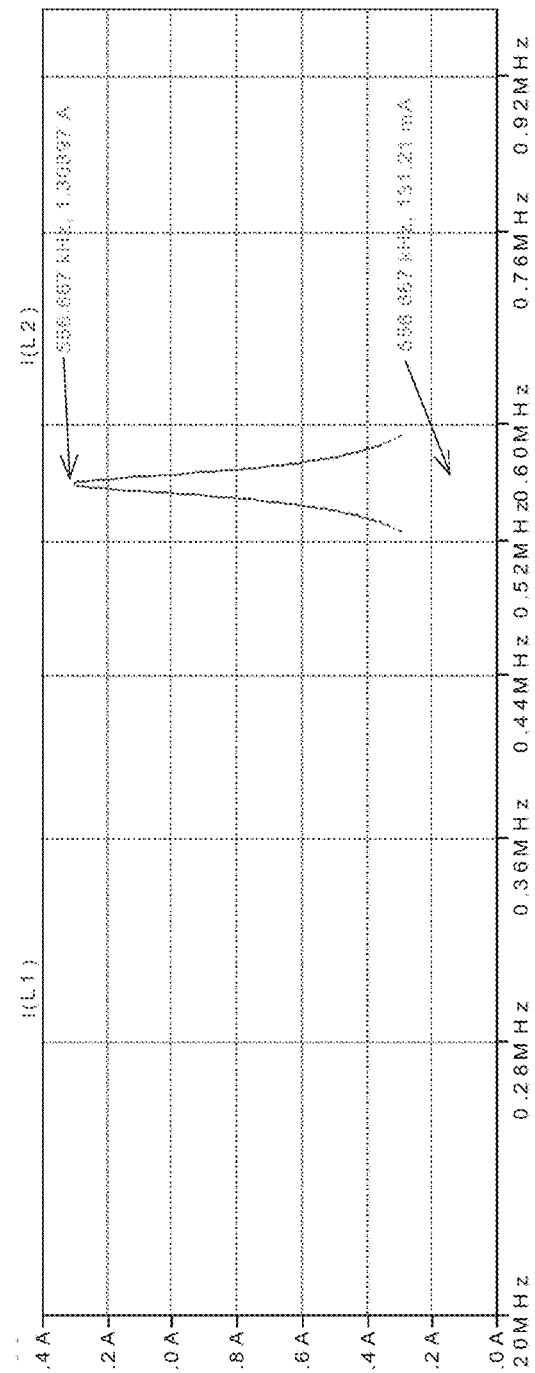
FIG. 9B shows an ac sweep of exciting only the left phase at 556 kHz.
Figure 9C:
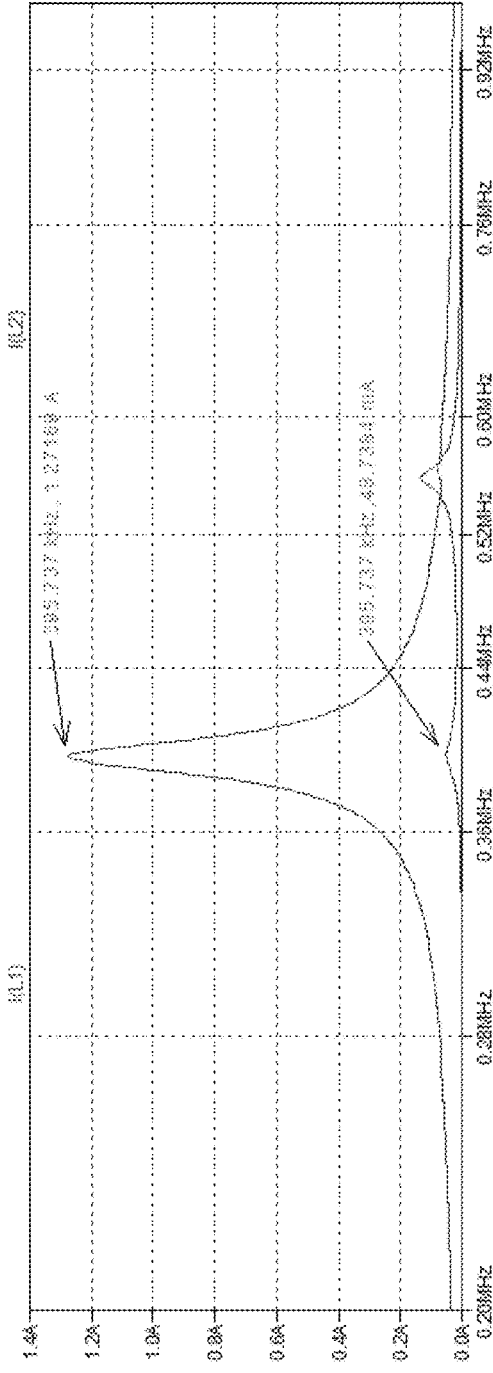
FIG. 9C shows an ac sweep of exciting only the right phase at 395 kHz.

An ac analysis has been performed in SPICE using the model shown in FIG. 9A. The parameters of the model are as obtained by measurement from the prototype shown in FIGS. 7A and 7B. One phase has a resonance at 556 kHz while the other phase has a resonance at 395 kHz. The ac sweep of exciting only the left phase at 556 kHz is shown in FIG. 9B. The ac sweep of exciting only the right phase at 395 kHz is shown in FIG. 9C. It can be seen due to mutual couplings between the phases, excitation of one phase induces current in the other phase. By properly selecting two different resonant frequencies for the two phases, the effect of cross-coupling can be heavily attenuated.

Demonstration

Figure 10A:
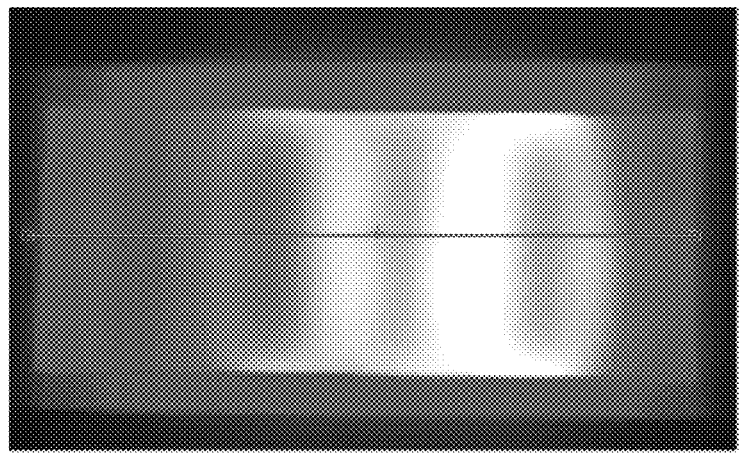
FIG. 10A shows a temperature profile produced by exciting the right phase.
Figure 10B:
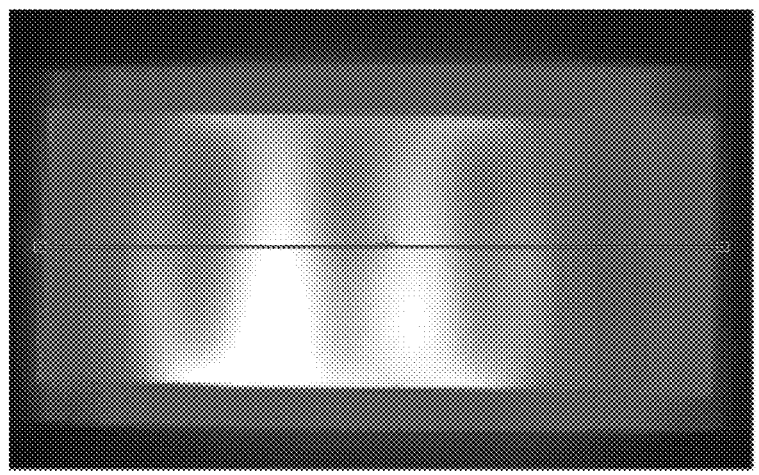
FIG. 10B shows a temperature profile produced by exciting the left phase.
Figure 10C:
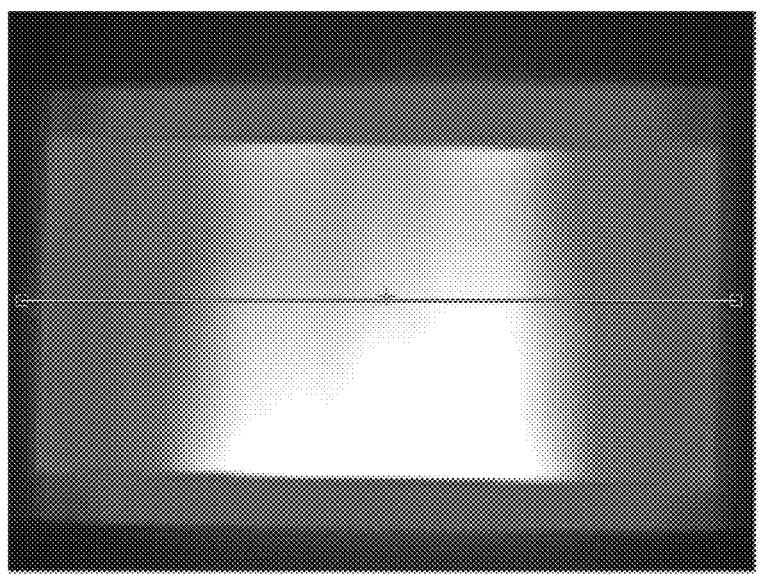
FIG. 10C shows a temperature profile produced by exciting both phases.
Figure 10D:
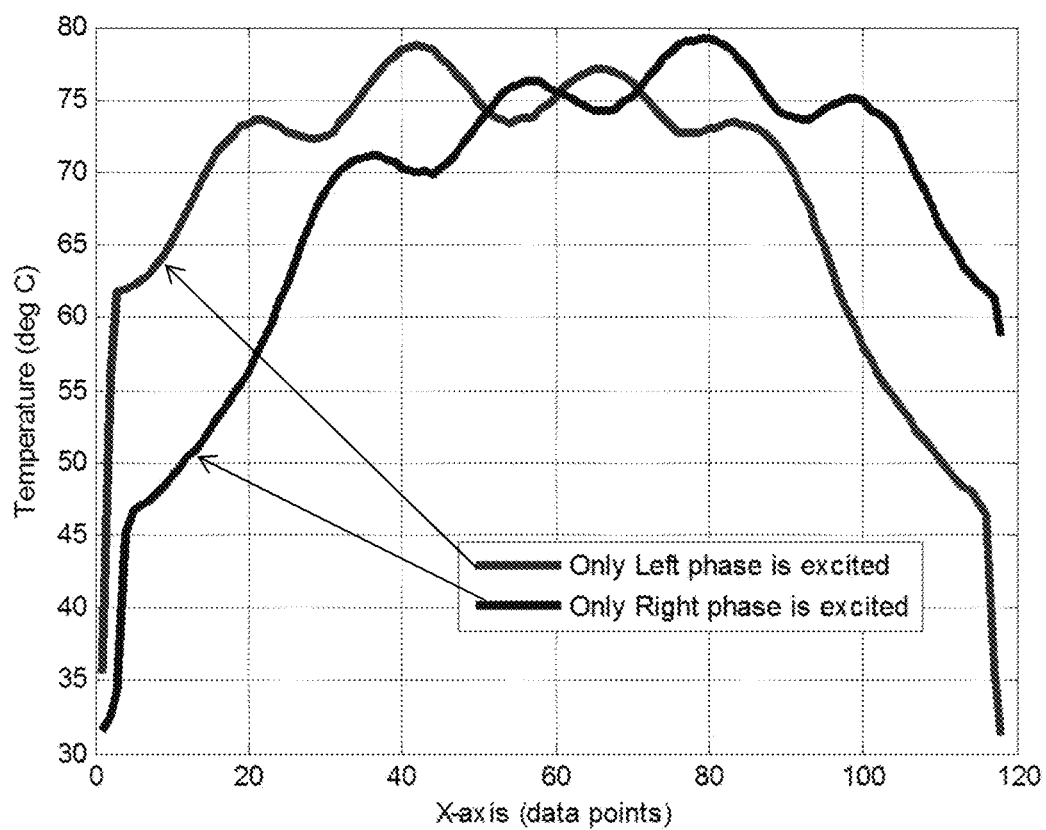
FIG. 10D a temperature profile produced by exciting the right phase and left phase individually.
Figure 10E:
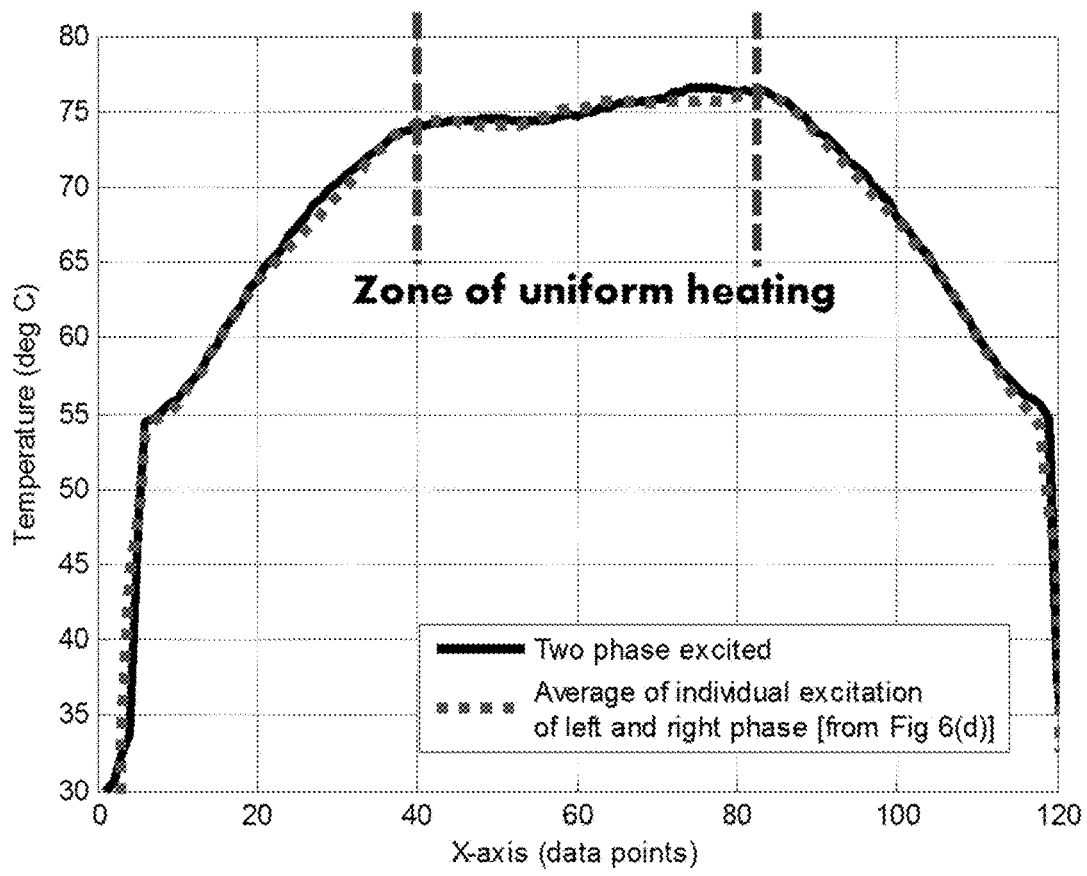
FIG. 10E shows a uniform temperature profile produced by exciting both phases.

The concept is evaluated experimentally using the prototype shown in FIGS. 7A and 7B and with the proposed excitation strategy. The results for an induction heating device are shown in FIG. 10. With right and left phases excited alone, the temperature profile is as shown FIG. 10A and FIG. 10B, respectively. The temperature profile along x-axis is shown in FIG. 10D where the spatial double harmonic component can be seen with each phase. In addition, the fringing effects of the individual windings can also be seen at the edges as the magnetic field tapers off. For each of these experiments, a total of 17 W of real power is fed to the resonant inverters. While the right phase excitation is tuned at 562 kHz, the left phase excitation is tuned at 398 kHz. Since the prototype has 4 poles, as can be seen in FIG. 6, the temperature profile also has four peaks and valleys. The variation of temperature while the left phase is excited is 180° out of phase compared to that of when the right phase is excited. This can be mathematically demonstrated based on equation (6) where one phase has a (1+cos(2kx)) profile while the other phase has (1−cos(2kx)) profile when excited individually. With two phase simultaneous excitation as proposed using the multi-resonant converter, keeping the total power fed to the two phase inverters to be 17 W, the temperature profile is more uniform, as can be seen in FIGS. 10C and 10E. The temperature variation along the length of the target when plotted shows a variation of 3° C. which can be further balanced using active power balancing of the two windings using digital closed loop control.

Winding Arrangements for Asymmetric Magnetic Fields

Both Halbach and Mallinson independently posited magnetization configurations that produce one-sided magnetic fluxes. Some of the theory for the ideal cases is derived in H. A. Shute, J. C. Mallinson, D. T. Wilton, and D. J. Mapps, "*One-sided fluxes in planar, cylindrical, and spherical magnetized structures,*" Magnetics, IEEE Transactions on, vol.

36, pp. 440-451, 2000. We can derive the magnetic flux density at a point z above and x along the Halbach surface with thickness d as $$B = \mu_0 M_0 (1 - e^{-kd}) e^{-kz} \cos kx. \quad (1)$$

where $k = 2\pi/\lambda$, is the radian reciprocal of the array wavelength and for a wound Halbach array $M_0 = \alpha k NI$, where NI are the amp-turns and $\alpha$ is a geometric factor.

The faster fall-off in field resulting from a Halbach surface can be advantageous in induction cooking appliances, including wide area, flexible cooking zones because the bottom of the pans are close to the surface so power transfer can be achieved while still minimizing stray fields.

Figure 11:
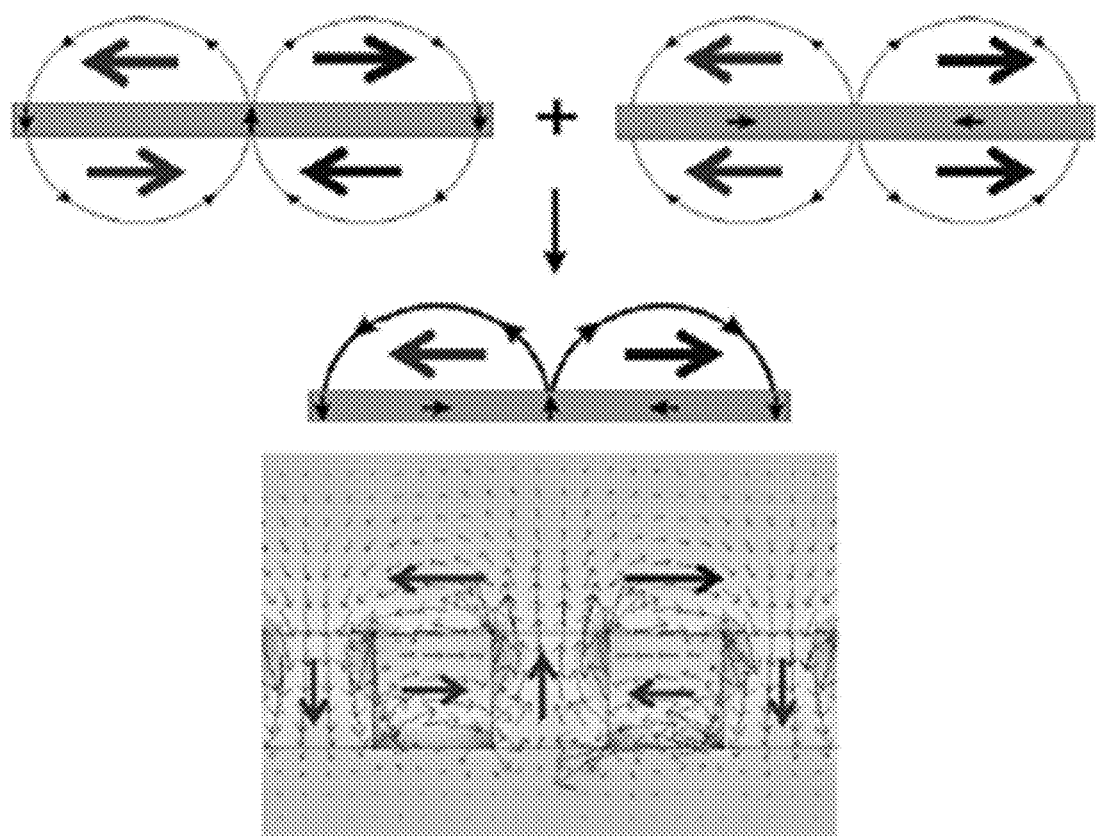
FIG. 11 shows a DC Halbach array.

FIG. 11 shows a DC Halbach array and illustrates the construction of a one-sided dc field using magnetizations from block permanent magnets. It shows how the superposition of an alternating pattern of vertical and horizontal magnetizations combine to produce twice the field on top and none on the bottom. For this case of a non-sinusoidal magnetization, a spatial Fourier decomposition could be used for analysis similar to that described in G. Zhou, X. Huang, H. Jiang, and R. Bo, "*Design and analysis of a novel ironless trapezoid winding array with single-sided and well sinusoidal magnetic field*," in Electromagnetic Field Computation (CEFC), 2010 14th Biennial IEEE Conference on, 2010, pp. 1-1, with the fundamental component given by (1).

Figure 12A:
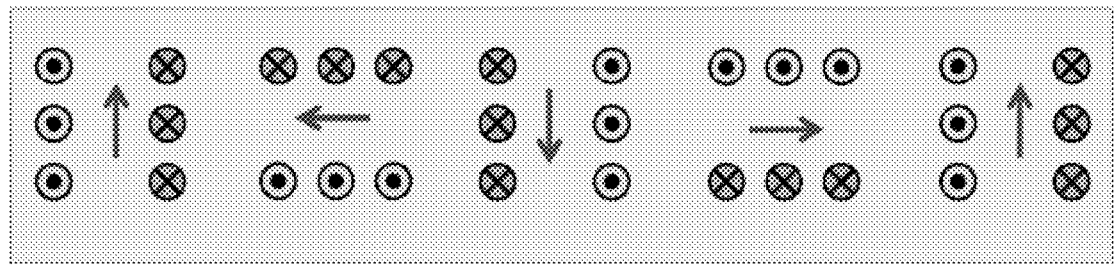
FIG. 12A-C show the compression of a unit cell for a wound Halbach array.
Figure 12B:
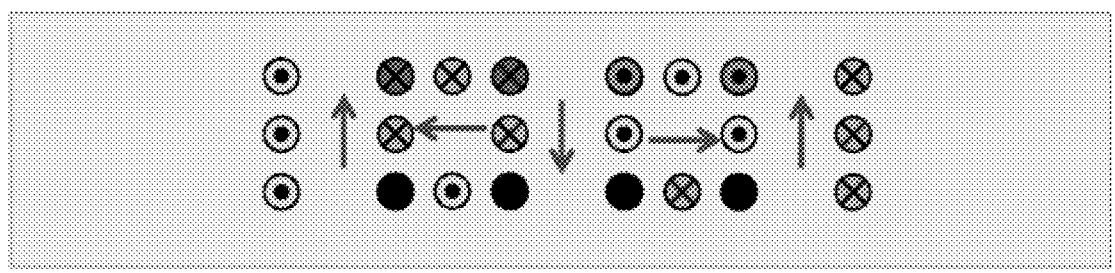
Figure 12C:
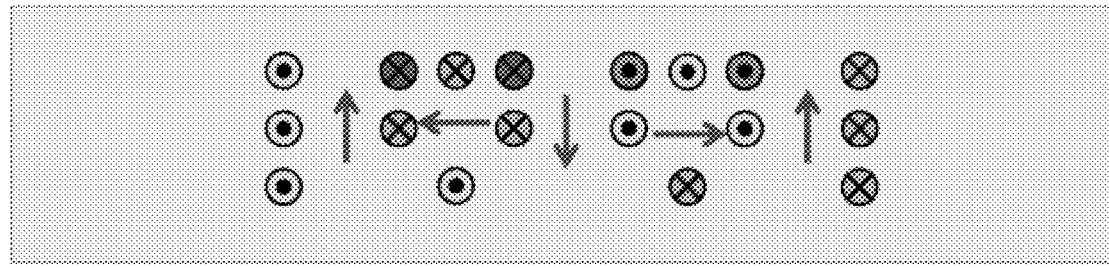
Figure 13:
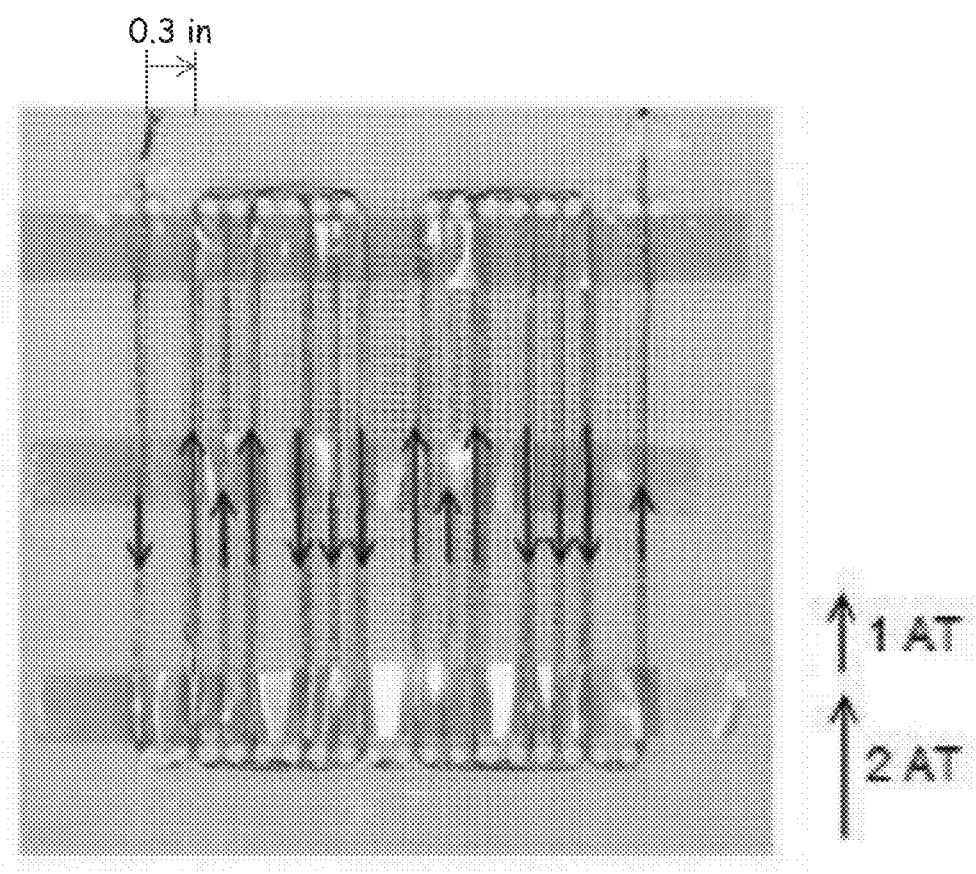
FIG. 13 shows the top layer of a two-dimensional implementation of the array.
Figure 14A:
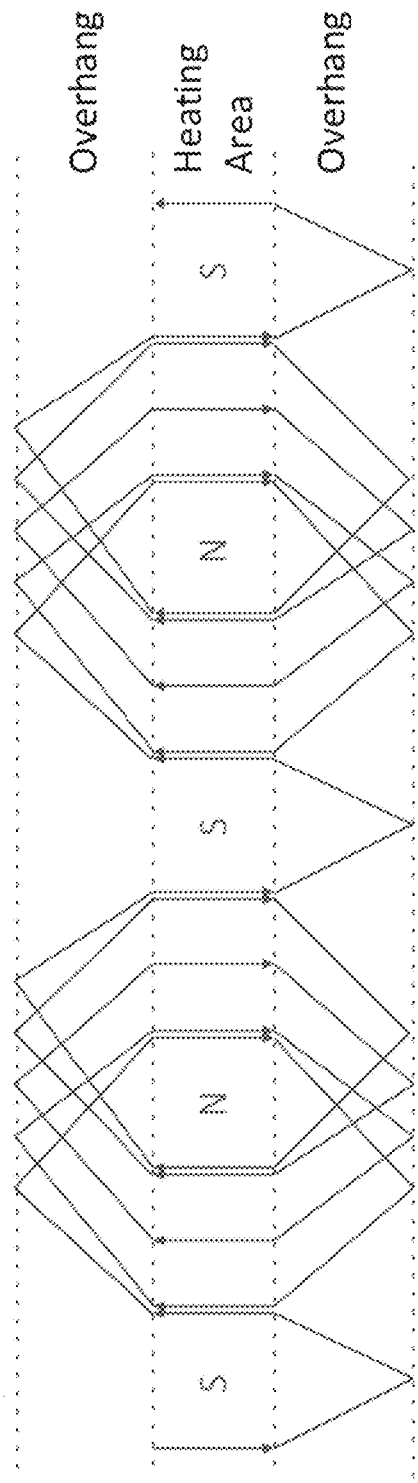
FIG. 14A-C illustrates top views of the lap windings schematically for each layer of a three-layer winding structure.
Figure 14B:
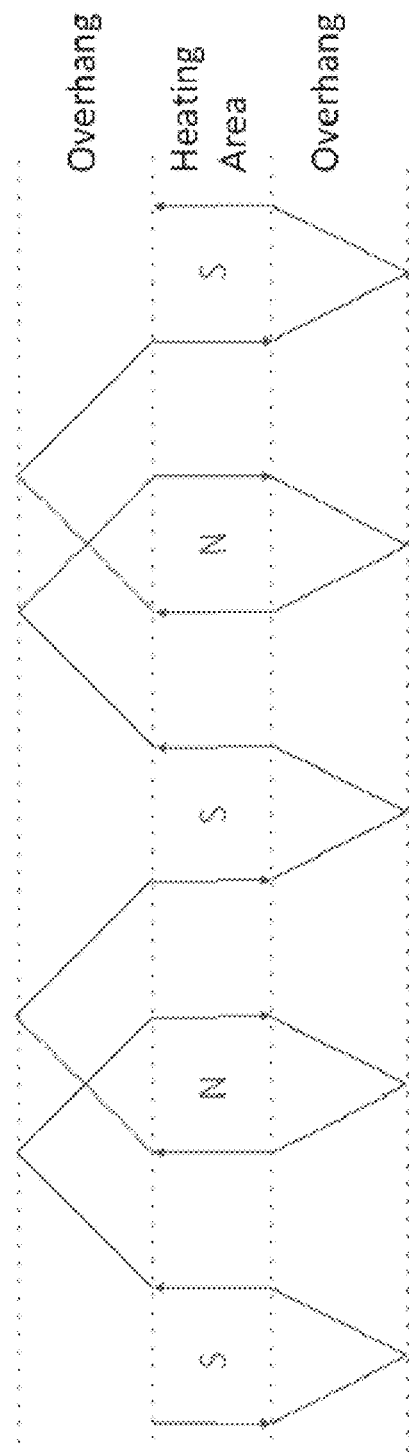
Figure 14C:
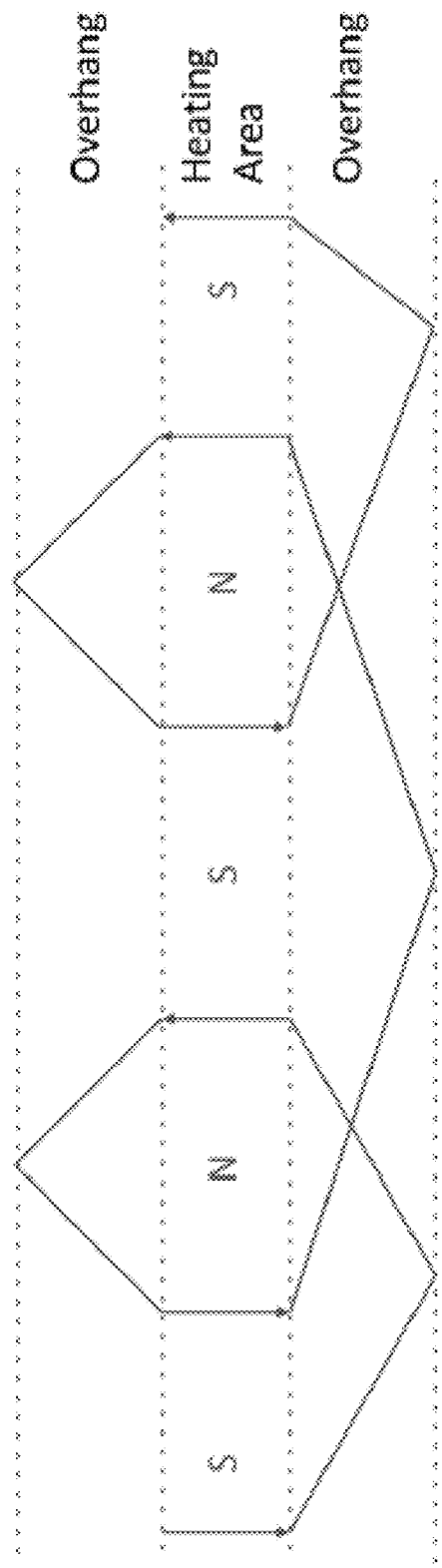

An example of a wound dc Halbach array can be found in G. Zhou, X. Huang, H. Jiang, and R. Bo, "*Design and analysis of a novel ironless trapezoid winding array with single-sided and well sinusoidal magnetic field*," in Electromagnetic Field Computation (CEFC), 2010 14th Biennial IEEE Conference on, 2010, pp. 1-1. FIG. 12 shows the compression of a unit cell for a wound Halbach array. In FIG. 12A, we approximate each magnetization with a three turn winding. If we compress the windings together as in FIGS. 12B and 12C, there is a doubling of amp-turns in some of the turns in the top layer, and cancellations on the bottom layer. This arrangement reduces the winding complexity with a decreasing winding density with each layer. FIG. 13 shows the top layer of a two-dimensional implementation of the array. In FIG. 13, arrows indicate per unit ampere-turns for the top layer of the winding structure. A two-dimensional approach means that each layer can be wound independently, which results in a reduction in winding and hence manufacturing complexity. FIG. 14 illustrates a top view of the lap windings schematically for each layer. FIG. 14A shows a top view of the lap windings for the top layer, FIG. 14B shows a top view of the lap windings for the middle layer, and FIG. 14C shows a top view of the lap windings for the bottom layer.

Finite Element Simulations

The inventors performed finite element simulations in COMSOL for frequency-dependent magnetic induction. In addition, the inventors performed a simulation using a multiphysics model that included heat conduction, convection, and radiation.

A. Magnetic Field Modeling

The inventors performed simulations at a nominal operating frequency of 500 kHz. By using a thin-wire approximation, skin and proximity effects in the winding can be neglected; this is a valid model for an experiment if the appropriate Litz wire is used.

Figure 15:
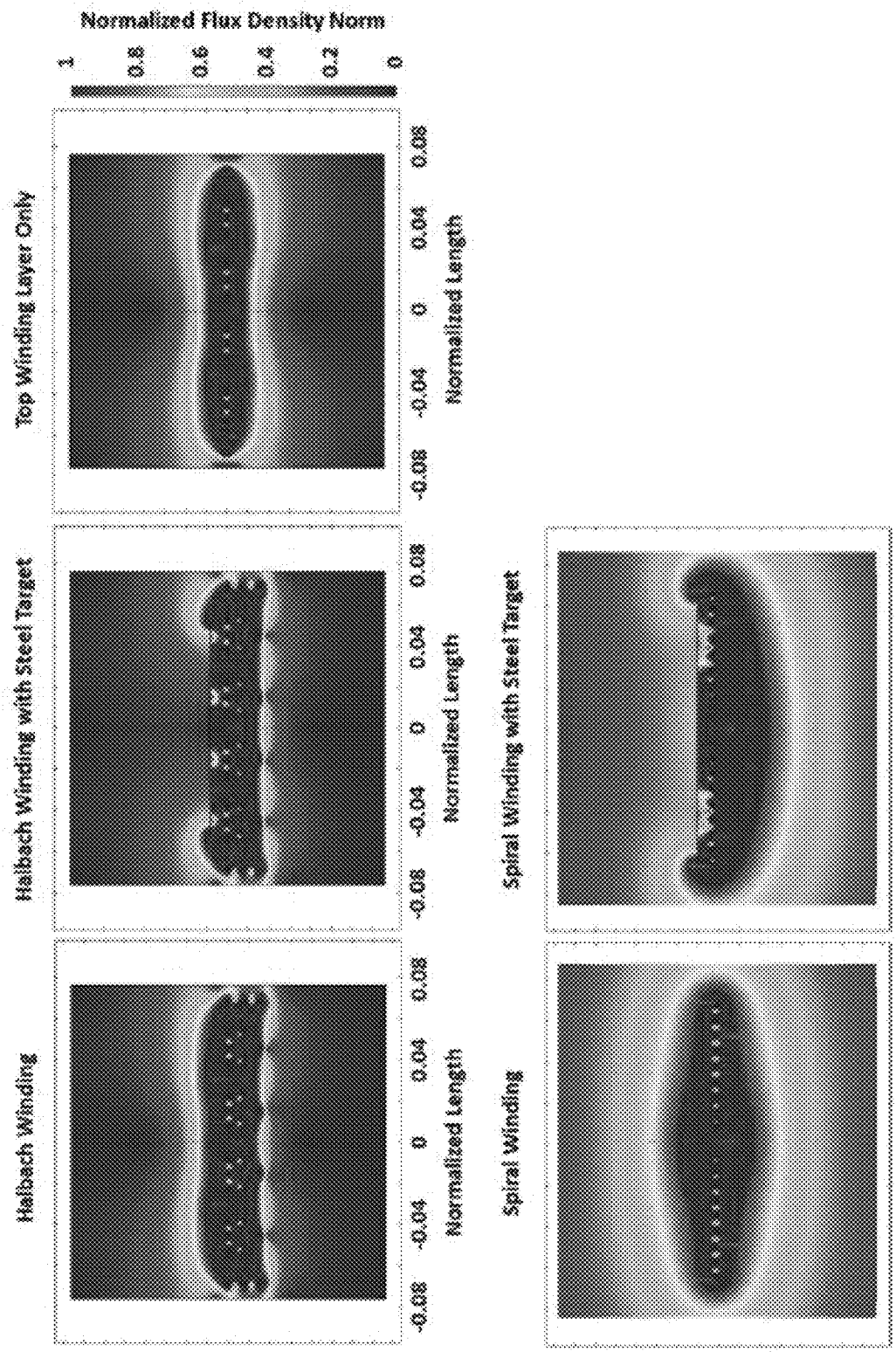
FIG. 15 illustrates two-dimensional finite element simulations of the magnetic flux density for several winding configurations including the three-layer Halbach winding arrangement.

FIG. 15 illustrates two-dimensional finite element simulations of the magnetic flux density for several winding configurations including the three-layer Halbach winding arrangement. What is noticeable is that the additional field below from adding a steel target on top of a Halbach winding is negligible. In addition, one observes that in comparison to a winding where only the top winding layer is used, the complete three-layer Halbach winding has a significantly higher concentration of magnetic flux above and a field that does not extend as far below.

Spiral windings are commonly used in induction stove applications; the configuration shown does not have the typically used ferrite substrate, and thus results in an extensive two-sided field. One observes that in placing a steel target, the flux at bottom increases and extends farther; this can imply that if a ferrite substrate were used on the bottom, the flux density it must carry is larger with a heating target, hence possibly resulting in higher overall loss.

Figure 16:
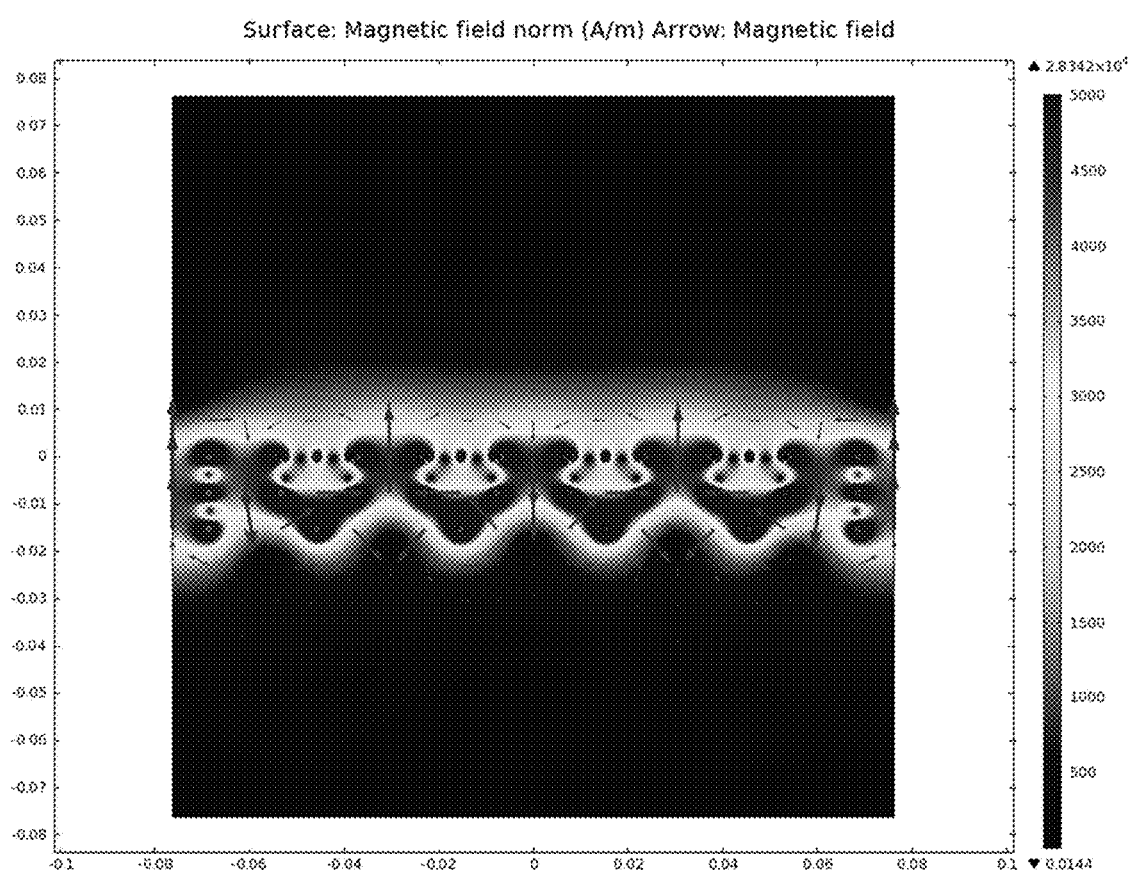
FIG. 16 illustrates that field distortion of the Halbach winding occurs for sufficiently high frequencies because of current density distortion from the proximity effect.

If we use a solid conductor winding and increase the diameter and frequency, proximity effects begin to dominate and distortion in the magnetic field occurs, resulting in decreased flux above and increased field below; this is illustrated in FIG. 16. FIG. 16 illustrates that field distortion of the Halbach winding occurs for frequencies of 500 kHz or higher because of current density distortion from the proximity effect. Litz wire can reduce this effect.

B. Multiphysics Modeling

Figure 17:
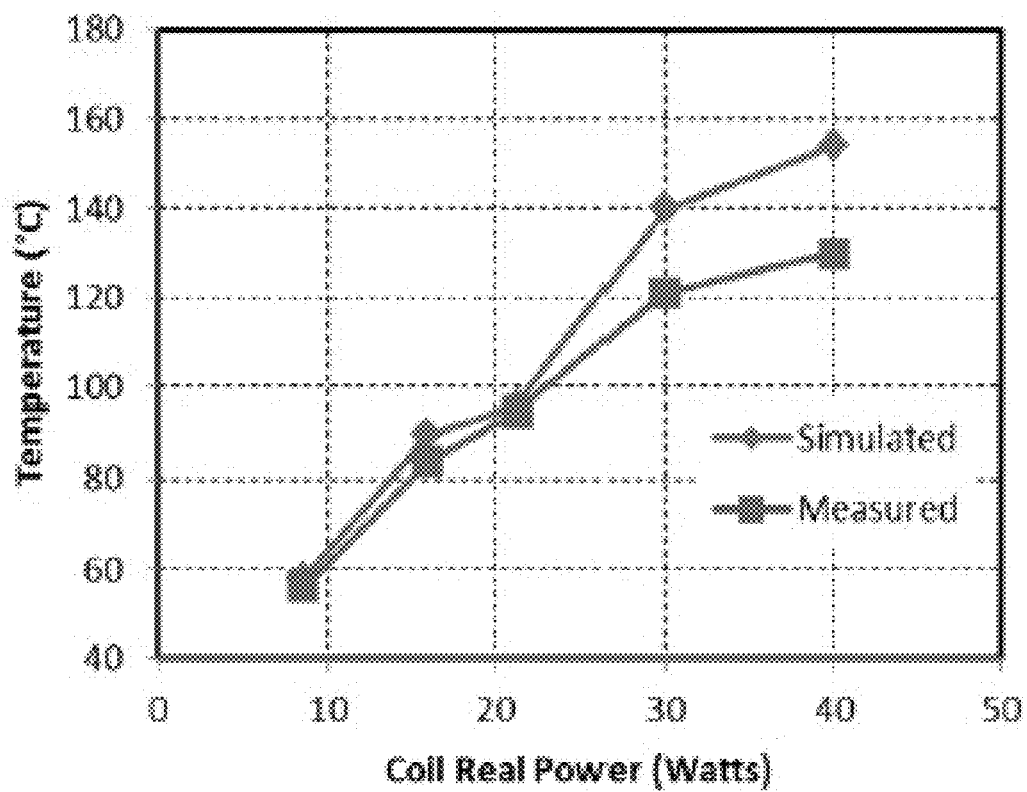
FIG. 17 shows a plot of temperature vs. real power measured vs. simulated in a multiphysics simulation.

The inventors performed a multiphysics simulation of temperature vs. real power, shown in FIG. 17, that includes models for heat conduction, convection, and radiation. The effect of resistive heating from the winding was discounted in the simulation by enforcing a thermally insulating boundary at the surface of the wire. Temperature dependent target resistivity is included as well. The results are given for steady-state temperature and power level. The simulation deviates from measurements at higher temperatures presumably because of regime changes in the convection model.

Experimental Results and Discussion

Figure 18:
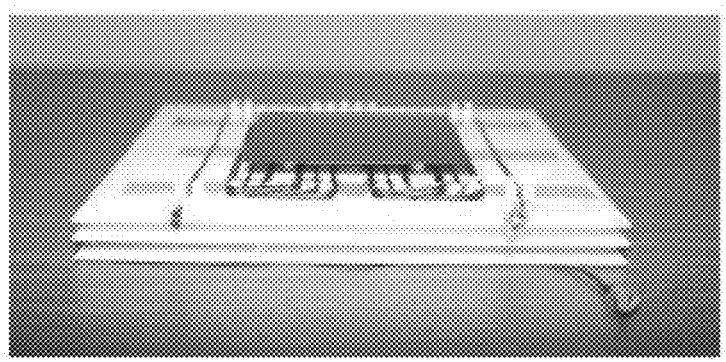
FIG. 18 shows a prototype Halbach winding array with three winding layers.

We constructed a prototype Halbach winding array on an FR4 perforated board, which is illustrated in FIG. 18. It includes three layers, as in FIG. 12. By lap winding the end turns, a significant number of the current segments cancel, hence reducing stray fields at the ends. Thin magnetic steel was used as a target to increase the in-plane thermal time constant, so that transient thermal effects could be observed using an infrared camera. Transient thermal behavior, i.e., step response to power, is useful in determining heating distribution and uniformity. The heating distribution is an indicator of the induced currents and hence magnetic flux distribution at the target. The top surface of the target was coated with high temperature black paint and calibrated to a thermocouple to calculate an emissivity of 0.97, which is needed for infrared temperature measurements.

Table I delineates the parameters for the experiments. The nominal operating frequency was chosen to maximize the ratio of the unloaded to the loaded Q for the particular target. This maximizes the target heating relative to the coil resistive loss.

TABLE I

INDUCTION HEATING PARAMETERS

| Coil Parameters | |
| --- | --- |
| Nominal Operating Frequency | 500 kHz |
| Unloaded Q | 78 |
| Front Loaded Q | 26 |
| Rear Loaded Q | 73 |
| Inductance | 8.2 µH |
| Winding Pitch (inches/mm) | 0.3/7.6 |
| Layer Spacing | 0.3/7.6 |
| Copper Litz Wire | 175 strands × 40 ga/ |

TABLE I-continued

INDUCTION HEATING PARAMETERS

| Target Parameters | 0.08 mm |
|---|---|
| Material | AISI 1008 Steel |
| Thickness | 10 mil/0.25 mm |
| Dimensions (inches/cm) | 4 × 4/10.2 × 10.2 |
| Nominal Relative Permeability | 1500 |
| Nominal Resistivity | $130 \times 10^{-9} \; \Omega \cdot m$ |
| Skin Depth at 500 kHz | 6.6 µm |
| Thermal Conductivity | 59.5 W/m · K |
| Specific Heat | 481 J/kg · K |
| Density | $7.87 \times 10^3 \; kg/m^3$ |
| Coating Emissivity | 0.97 |
| Gap to Coil (inches/mm) | 3/8"/9.5 |

The induction coil was connected as part of a series resonant circuit to a half-bridge MOSFET inverter as shown in FIG. 8A. The series capacitor is a parallel combination of ceramic capacitors for high current capability. However, the techniques described herein are not limited in this respect.

Figure 19:
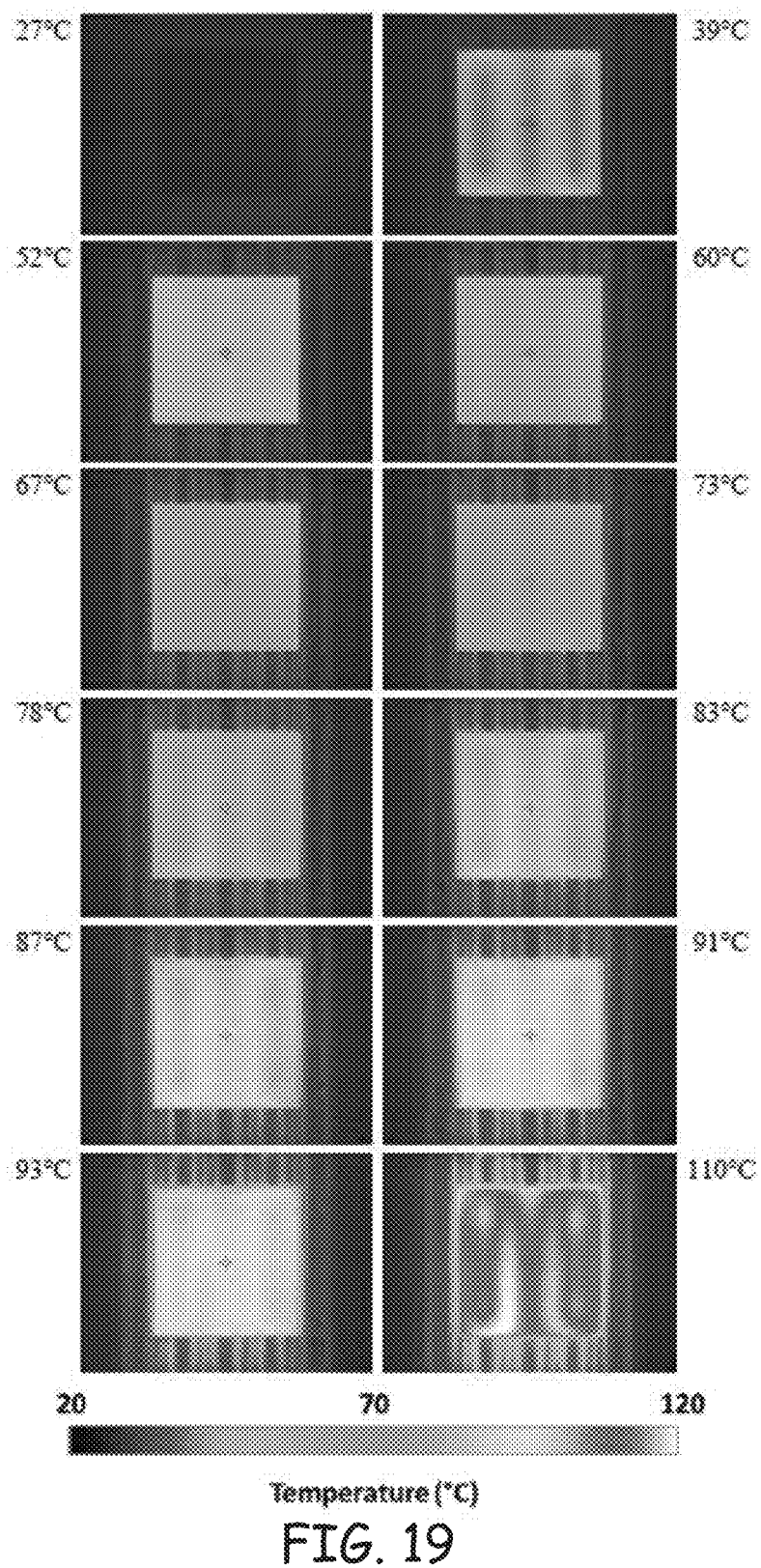
FIG. 19 shows the time/temperature evolution of target heating with a step input in sinusoidal coil current amplitude.

A Fluke TI 20 was used to image the target heating in the infrared. FIG. 19 shows the time/temperature evolution of target heating with a step input in sinusoidal coil current amplitude. This only approximates a step in power because target resistance is a strong function of temperature. There appears to be a small air current along the top of the target appearing vertically in the figures, which becomes more pronounced at higher temperatures.

Figure 20:
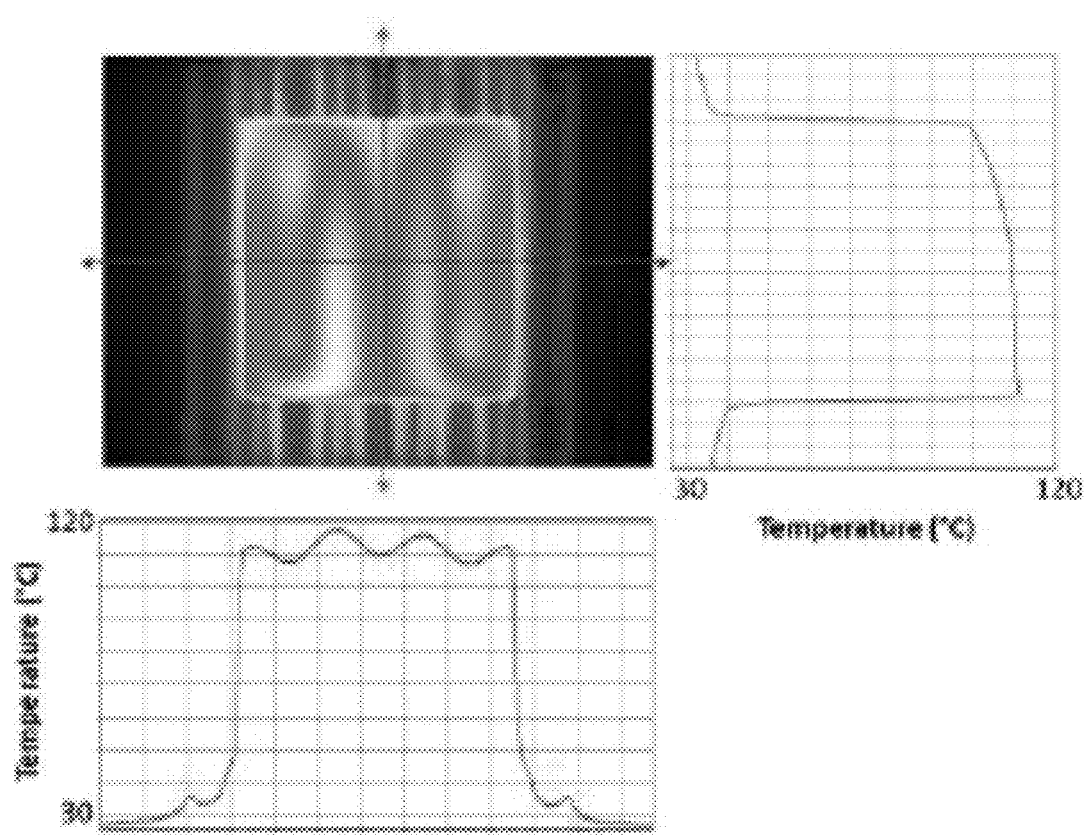
FIG. 20 shows the temperature profile of a target on top of a Halbach winding along the lines bisecting the target.

From the images, we also extracted the temperature profiles along the two bisecting axes of the target. FIG. 20 shows the temperature profile of a target on top of Halbach winding along the lines bisecting the target. Bisection lines along which the corresponding temperature profiles as measured are shown. The spatial axis of the temperature profile corresponds to that of the image. In FIG. 20, the temperature profiles along each direction appear relatively uniform. The temperature profile within the heating zone in the horizontal axis shows a sinusoidal variation, which is what is expected from a thermal low-pass of the intensity of the inductively coupled magnetic flux from a Halbach array.

Figure 21:
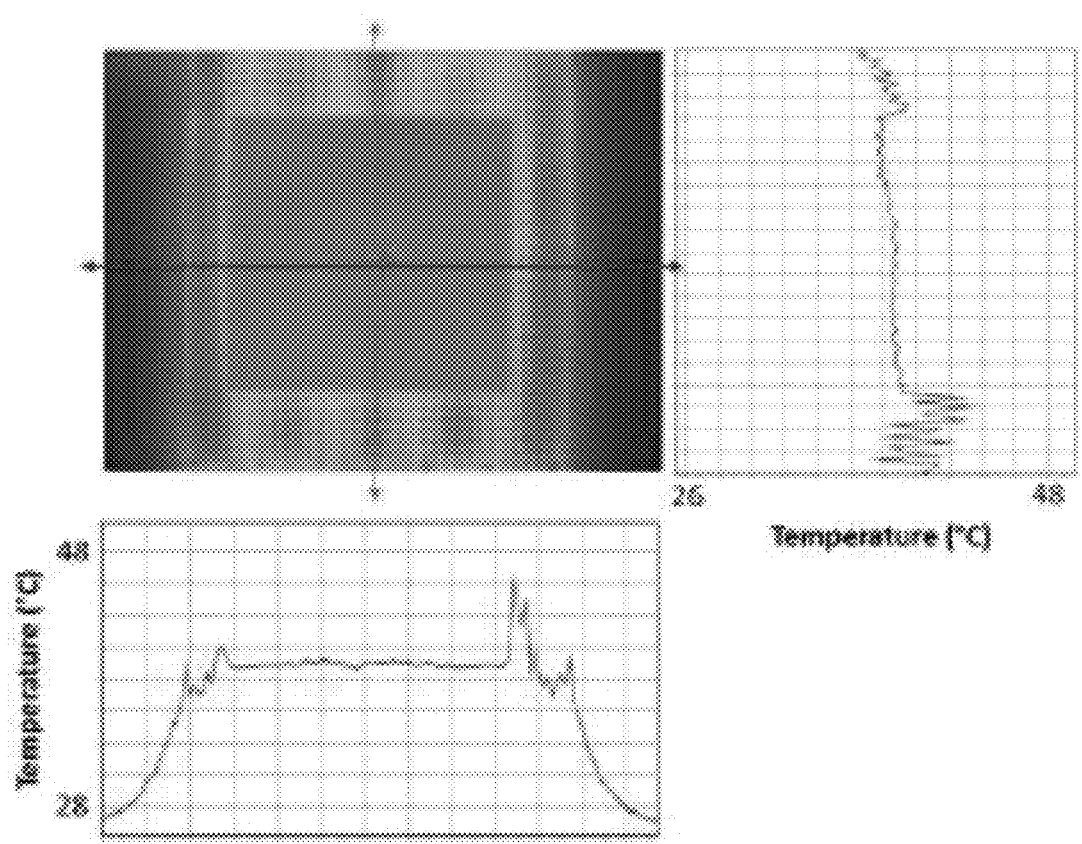
FIG. 21 shows the temperature profile of a steel target on the bottom side of the Halbach induction winding, which illustrates negligible inductive heating.

FIG. 21 is a salient illustration of a single-sided flux. FIG. 21 shows the temperature profile of steel target on the bottom side of the Halbach induction winding, which illustrates negligible inductive heating. Bisection lines along which the corresponding temperature profiles are measured are shown. The spatial axis of the temperature profile corresponds to that of the image. The target is only heated by the resistive losses from the hotter winding. The thermal radiation from the bottom winding is apparent through the perforated FR-4 substrate. No inductive heating pattern is apparent in the temperature profile of the target.

Figure 22:
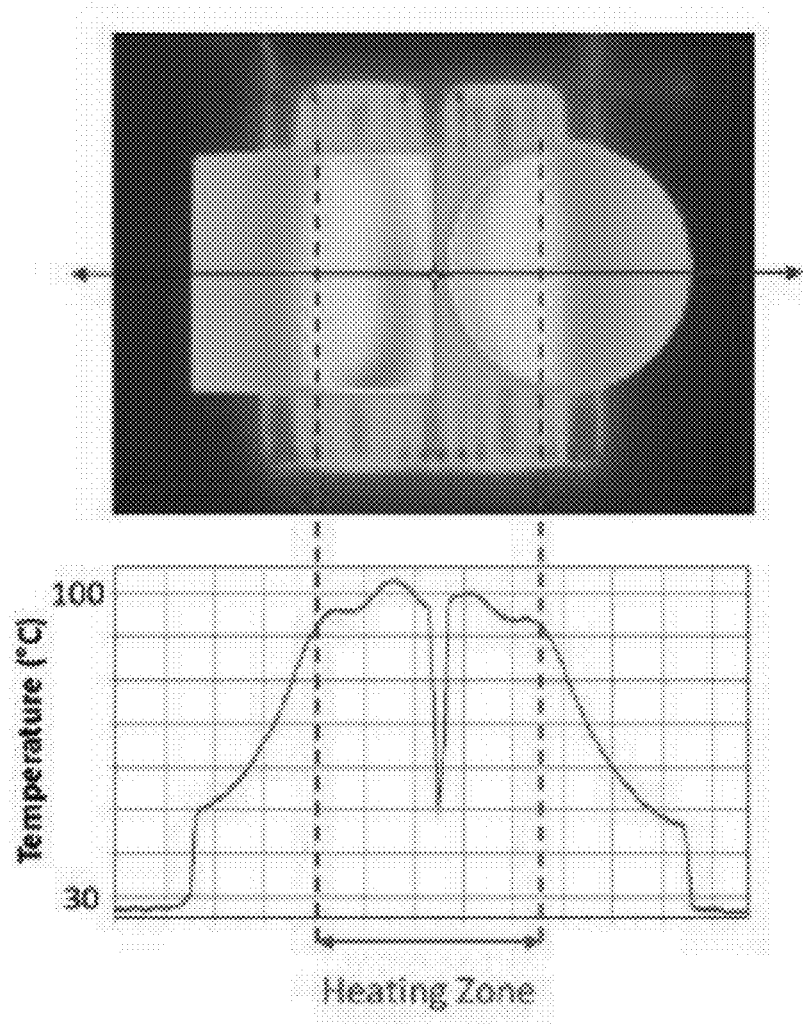
FIG. 22 illustrates a well-defined heating zone, as well as the heating effects on circular and rectangular targets.

The inductive heating element has a relatively well-defined heating zone, which is illustrated in FIG. 22. This is consistent with the magnetic flux distribution on the target in FIG. 15. The bisection line along which the corresponding temperature profile is measured is shown. The spatial axis of the temperature profile corresponds to that of the image. Beyond the heating zone, the expected exponential drop-off from heat diffusion is apparent. This shows that edge effects are not that significant in that a relatively sharp boundary is formed for the heating zone, which is also consistent with the simulations shown in FIG. 15. FIG. 22 also serves as an illustration and comparison of the heating effects on circular and rectangular targets.

EXAMPLE 2

Two-Layer Stacked Winding Structure

This section presents a Halbach winding arrangement based on maximizing the ratio of energy distribution on the top compared to the bottom for a given winding configuration. The investigation leads to an optimized Halbach winding with only two layers of conductors. Further, a second two-layered Halbach winding can be superimposed that is spatially orthogonal to the original winding to create a multiphase Halbach winding arrangement. Ideally the two windings are decoupled by the spatial arrangement; using currents that are temporally orthogonal leads to a traveling magnetic field, resulting in uniform heating. Temporal orthogonality is typically implemented by exciting two currents at the same frequency but 90° out of phase. In practice, a small coupling between the windings exists because of finite tolerances. This leads to difficulty in simultaneously maintaining the phase orthogonality and controlling the individual current magnitudes. By using two different frequencies, both temporal orthogonality and independent magnitude control can be achieved, enabling a uniform heating profile. An 8 inch×15 inch prototype designed with the proposed concept is used to demonstrate uniform single sided induction heating along with the associated resonant circuits.

Multiphase Halbach Winding Design

For induction heating applications, such as an induction cooktop, where only one sided heating is necessary, a Halbach arrangement can significantly reduce the need for magnetic shields at the bottom, which typically include ferrites and conductor plates. The magnetic field in the induction cooktop needs to be time-varying to induce current on the target for Joule heating. Windings can be designed that carry time-varying currents placed so that a magnetic field is produced only on a single side.

The following section discusses the design of a winding arrangement that can emulate a Halbach array so that the magnetic field on the top is much greater than the bottom. The design is based on a four-step process. First, the magnetic field and the stored energy are calculated in different sections for an arbitrary arrangement of conductors in an enclosed volume. Second, the conductor ampere-turns and locations are optimized so that the magnetic energy on the top dominates. Third, the effect of introducing highly permeable materials at the top and bottom of the optimized conductor arrangement is investigated using a finite element simulation. Finally the conductors are connected so that the appropriate current polarities form a Halbach winding array.

A. Stored Energy in the Magnetic Field for an Arbitrary Conductor Arrangement

Figure 23:
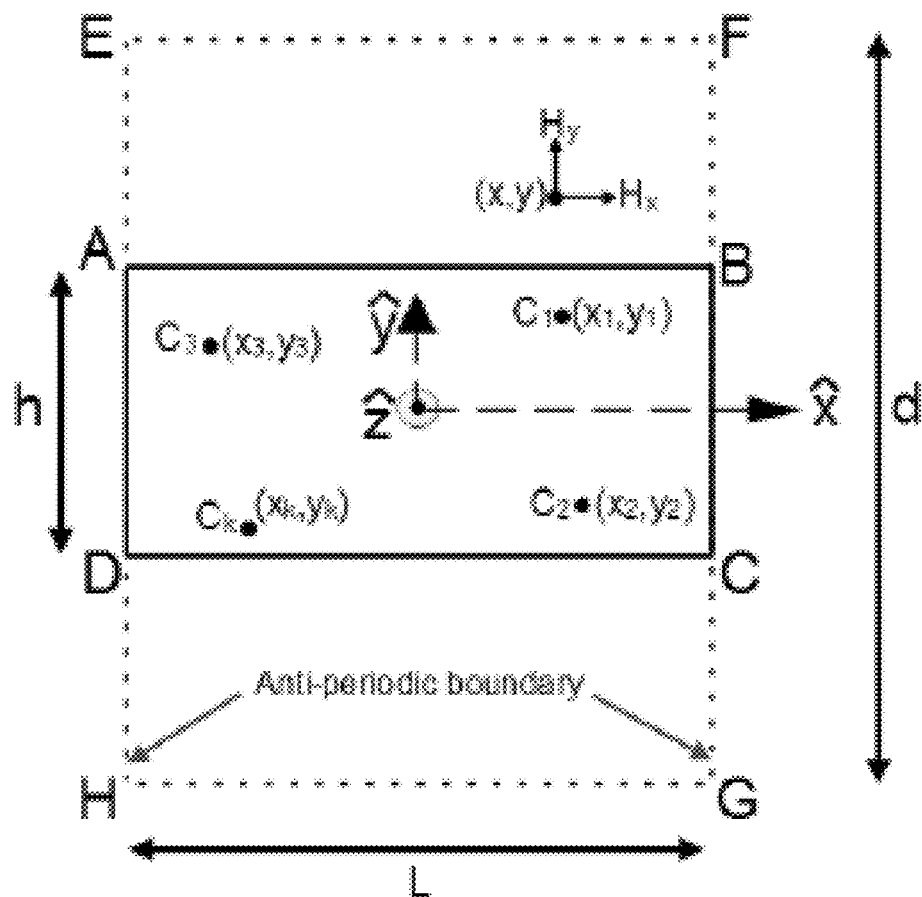
FIG. 23 shows a unit cell of an arbitrary conductor arrangement.

An arbitrary conductor arrangement ($C_1, C_2, C_3, \ldots, C_k$) is considered within a rectangle ABCD of length L and height h as shown in FIG. 23. In a three-dimensional coordinate frame, the rectangle is assumed to have unity dimension in the z direction. The conductors carry different amp-turns (ATs), either positive or negative, along the z-direction. The magnetic field at a distance (x,y) due to each of these conductors can be calculated from Ampere's Law. Assuming that the magnetic field has no variation along the z-direction, the net magnetic field at (x,y) due to the complete arrangement can be calculated by superposition and is given by, $$H_{x,na} = -\sum_{i=1}^{K} \frac{c_i(y - y_i)}{2\pi[(x - x_i)^2 + (y - y_i)^2]} \quad (1)$$

$$H_{y,na} = \sum_{i=1}^{K} \frac{c_i(x - x_i)}{2\pi[(x - x_i)^2 = (y - y_i)^2]}$$

$$\overline{H_{na}} = H_{x,na}\hat{x} + H_{y,na}\hat{y}$$

To emulate a Halbach array, the energy stored on the top section of the conductor arrangement, represented as ABEF in FIG. 23 should be significantly greater than the energy stored in the bottom section, represented as DCHG. Assuming that the conductor arrangement is periodic along the x-direction with periodicity of length L but with alternating polarity of ATs, the boundary condition along 'EH' and 'FG' can be applied as, $$H_{x,EH} = H_{x,FG} = 0$$

$$H_{y,EH} = -H_{y,FG} \quad (2)$$

Assuming EFGH is free space, the stored energy in the three sections, top ABEF, middle ABCD and bottom DCGH, are given by, $$E_{top} = \frac{\mu_0}{2} \int_{-L/2}^{L/2} \int_{h/2}^{d/2} H_{na}^2 \, dydx \quad (3)$$

$$E_{bottom} = \frac{\mu_0}{2} \int_{-L/2}^{L/2} \int_{-h/2}^{h/2} H_{na}^2 \, dydx$$

$$E_{middle} = \frac{\mu_0}{2} \int_{-L/2}^{L/2} \int_{-d/2}^{-h/2} H_{na}^2 \, dydx$$

B. Optimization of Conductor Arrangement Using a Genetic Algorithm

The design goal is to optimize the conductor locations ($x_k$, $y_k$) and the ampere-turns $C_k$ of the K conductors in ABCD to maximize the ratio of the magnetic field at the top to the magnetic field at the bottom. Quantitatively, the directional property can be expressed by a parameter F, the Directivity, which is defined as the ratio of total magnetic energy on the top to the total magnetic energy in the bottom, $$\Gamma = \frac{E_{top}}{E_{bottom}} \quad (4)$$

Additionally, the effectiveness of the conductors in transferring energy to the top relative to the energy stored in the middle and the bottom can be indirectly measured using the parameter Λ, the Effectivity. This is defined as the ratio of total magnetic energy on top to the sum of the total energies stored in the middle and bottom, $$\Lambda = \frac{E_{top}}{E_{bottom} + E_{middle}} \quad (5)$$

The inverse product of Γ and Λ is used as the cost function for the conductor arrangement optimization. Based on reducing the complexity of the final winding structure and the spatial harmonic content of the magnetic field, three constraints are placed on $x_k$, $y_k$ and $C_k$. First, constraining $y_k$—between two discrete levels +h/2 and −h/2 enforces two layers of conductors to synthesize the winding pattern. This minimizes the amount of copper required, as well as the cost of manufacturing for the overall winding. However, h is a free optimization variable that determines the distance between the two layers. Second, constraining $C_k$ to only signed integer values (Z) allows the use of a single continuous wire for constructing the winding. Finally, symmetry across the y-axis, shown in FIG. 23, is imposed to eliminate the even harmonics in the spatial distribution of the magnetic field. That is, if a conductor is placed at ($x_k$, $y_k$) carrying the $C_k$ AT, there is another conductor placed at (−xk, yk) carrying equal AT. Symmetry enforces bounds on $x_k$ between origin and half of the length. The complete optimization problem is, $$\min_{x_i, y_i, C_i, h} S = \frac{1}{\Gamma \Lambda} \quad (6)$$

Subject to:

$$|x_i| < L/2$$

$$y_i \in \left[-\frac{h}{2}, \frac{h}{2}\right]$$

$$C_i \in Z$$

$$(-x_{1+(K/2)}, y_{1+(K/2)}, C_{i+(K/2)}) = (x_i, y_i, C_i)$$

$$i \le \frac{K}{2}$$

Table I summarizes the actual values chosen for the different variables for an example design of a Halbach conductor arrangement using six total conductors. The optimization is run in MATLAB using the Genetic Algorithm in the Optimization Toolbox. For ease of numerical integration to evaluate stored energy in different sections using (3), the bounds on the integral are chosen such that they do not enclose the conductors.

TABLE 1

OPTIMIZATION FOR AN EXEMPLARY DESIGN:
PARAMETERS AND VARIABLE BOUNDS

| Parameters | Values | |
| --- | --- | --- |
| L | 1.2 inch | |
| K | 6 | |
| d | 12 inch | |
| Variables | Lower Bound | Upper Bound |
| h | 0.05 inch | 0.4 inch |
| Z | −1 | 1 |

Figure 24:
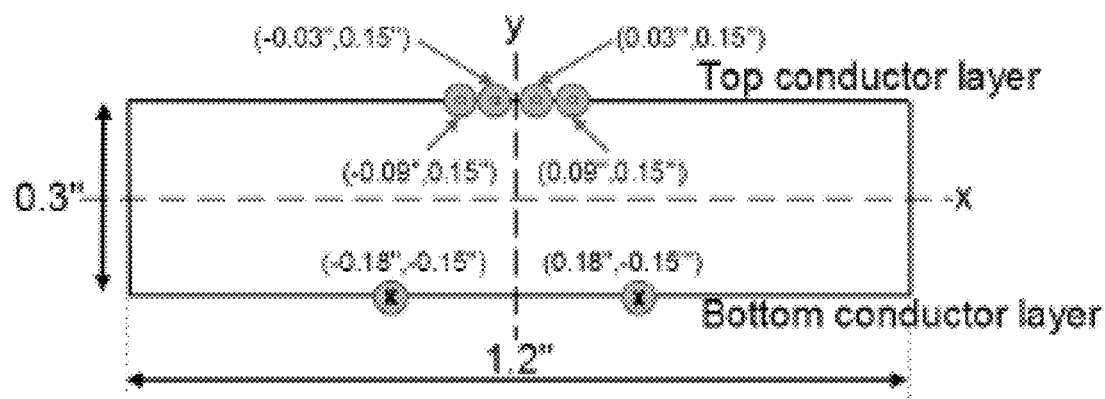
FIG. 24 shows an optimized Halbach cell with six conductors for the chosen parameter and geometry bounds for a two-layer winding structure.
Figure 25:
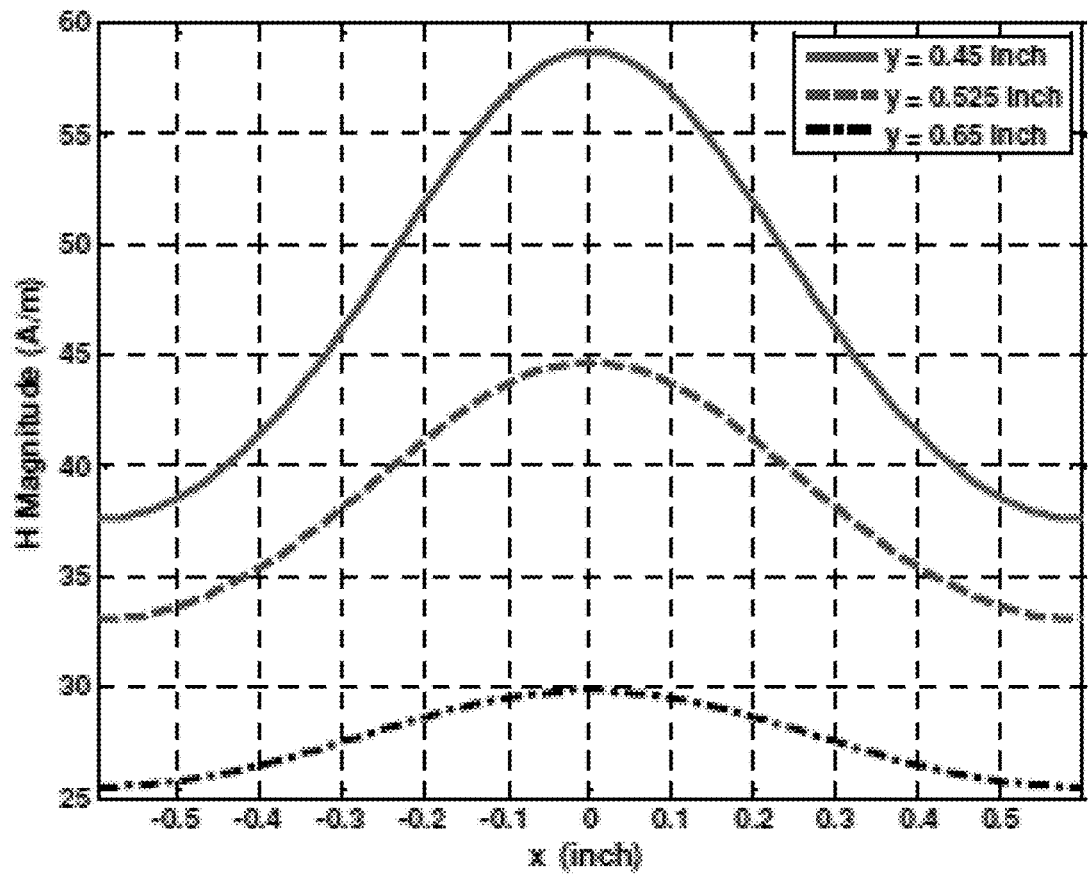
FIG. 25 shows a near-sinusoidal variation of the magnetic field magnitude along the x-dimension at a selected distances away from the top layer.
Figure 26:
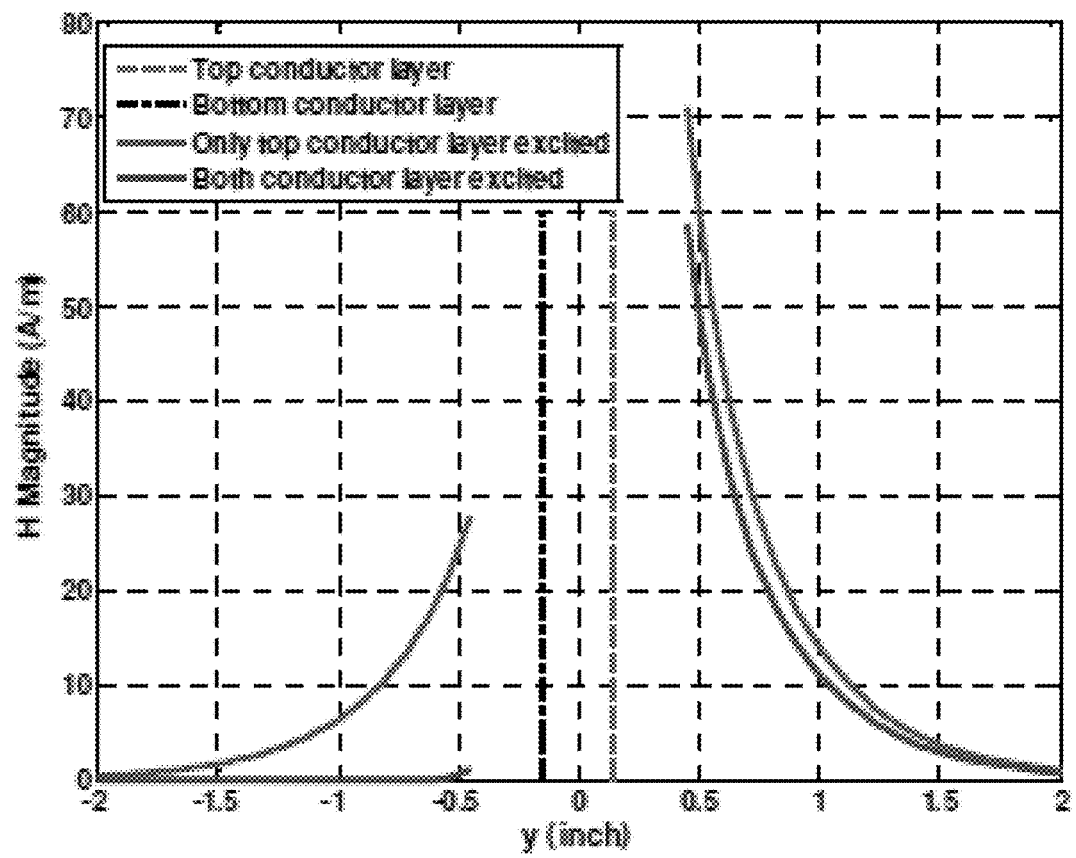
FIG. 26 shows the variation of magnitude of the magnetic field as a function of distance along the y-direction at x=0.

FIG. 24 shows the optimized conductor placement and ATs generated by the genetic algorithm based on the parameters and constraints. FIG. 24 shows an optimized Halbach cell with six conductors for the chosen parameter and geometry bounds. The magnitude of the magnetic field, H for the optimized conductor arrangement is calculated using (2). The near-sinusoidal variation of the magnitude along x-direction at a certain distance away from the top layer is shown in FIG. 25. As expected, the magnitude decreases with an increase in distance in the y-direction. FIG. 26 shows the variation of magnitude of the magnetic field as a function of distance along y-direction at x=0. The dashed lines demarcate the location of the top conductor layer and the bottom conductor layer. As expected, the bottom conductor layer drastically improves the roll off of the magnetic field at the bottom so that it is negligible at 0.5 inches away. It is clear that this effect is not due to the distance as the absence of the bottom conductor layer increases the magnetic field in the bottom. A less significant impact from the bottom conductor layer can be observed on the top side magnetic field. The magnetic field pattern as shown in FIGS. 25 and 26 closely resemble the field pattern from an ideal Halbach array.

Figure 27A:
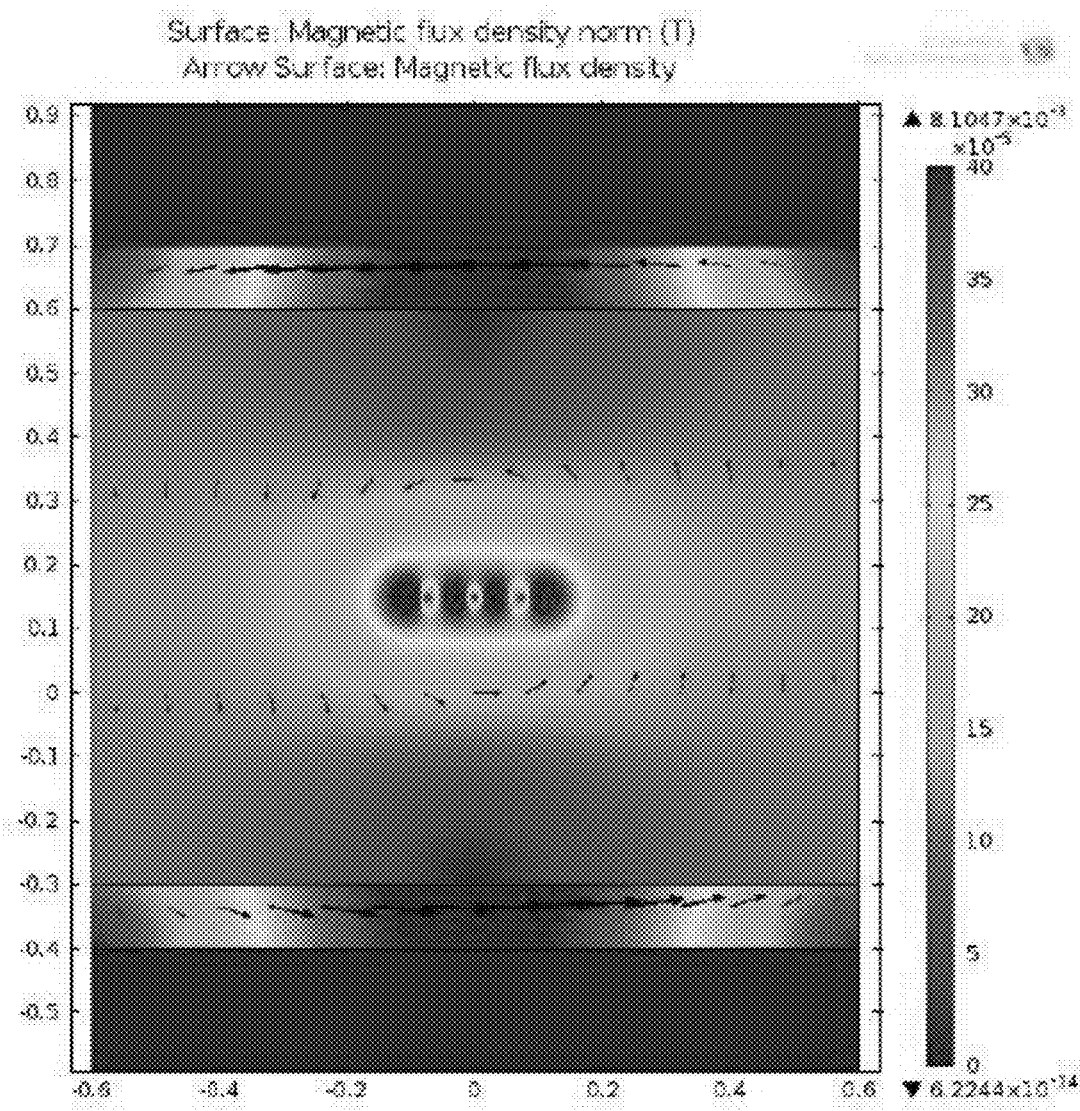
FIG. 27A shows the flux density distribution when two highly permeable (steel) targets are placed equidistantly from the top conductor layer, with only the top conductor layer excited.
Figure 27B:
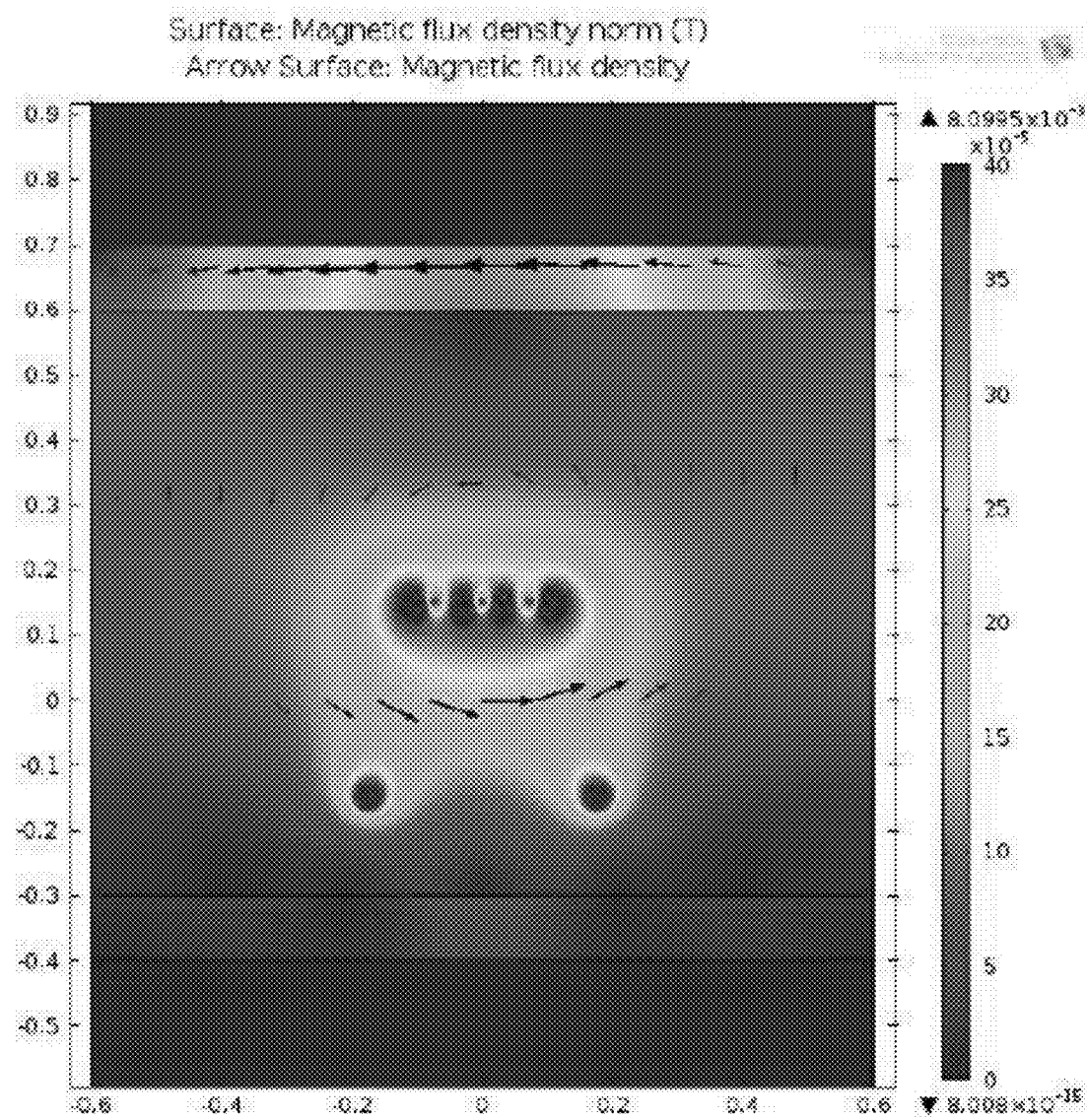
FIG. 27B shows excitation of both the top and bottom conductor layers produces a field above the stacked winding structure.

So far the computation of the energy and the optimization has been based on the assumption that the conductors are in free space and without any permeable material (target) in proximity. A static finite element analysis is performed in COMSOL to evaluate the presence of a highly permeable material in proximity to the optimized Halbach cell. FIG. 27A shows the flux density distribution when two highly permeable (steel) targets are placed equidistantly from the top conductor layer. Without energizing the bottom conductors, equal flux density is observed on both of the targets, as expected. The excitation of the second layer, as shown in FIG. 27B cancels much of the field on the bottom compared to the top. The conductors between the adjacent cells, when connected together with the correct current polarity, form a single phase winding with multiple cells behaving together to form a complete Halbach array.

C. Realization of Two-Phase Halbach Winding for Uniform Heating

The single-phase Halbach winding designed in the previous section is able to produce directional magnetic fields. However, the magnetic field has a near-sinusoidal variation along x-direction on the top as seen in FIG. 25. This results in a pulsating magnetic field of varying magnitude along the x-direction when the winding is excited with time-varying current. This creates a non-uniform heating pattern on the target.

Non-uniformity in heating can be mitigated by using multiple spatial phases of Halbach windings. In the example winding design, a two-phase winding structure is created by interleaving two sets of the Halbach windings such that they are spatially orthogonal, i.e., the flux from one of the phase windings ideally does not couple with the other phase winding. The two-phase windings layout and dimensions are shown in FIG. 28.

Figure 28:
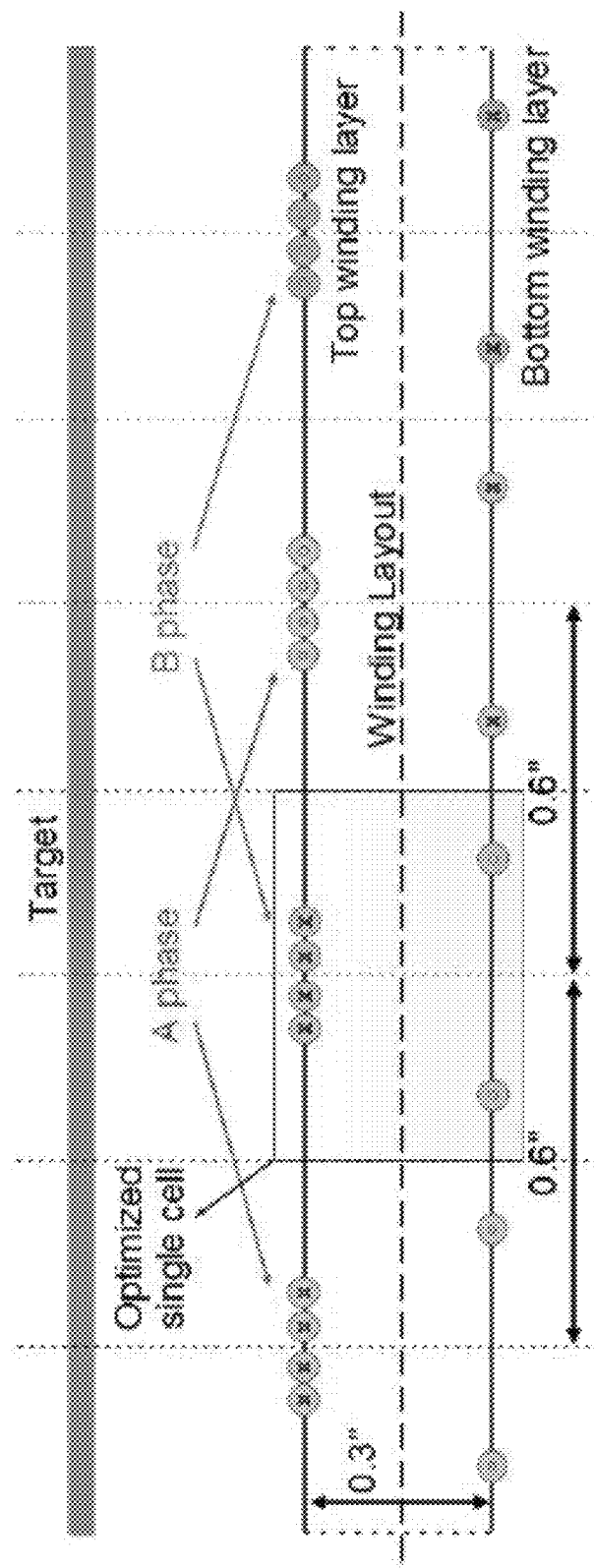
FIG. 28 shows an example winding layout for a two-layer winding structure.
Figure 29A:
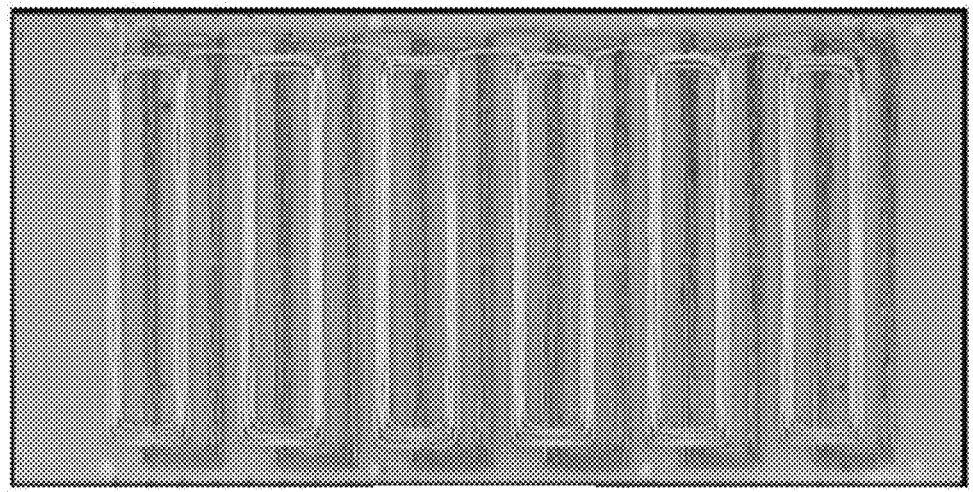
FIGS. 29A-C show a prototype of the two-layer winding structure.
Figure 29B:
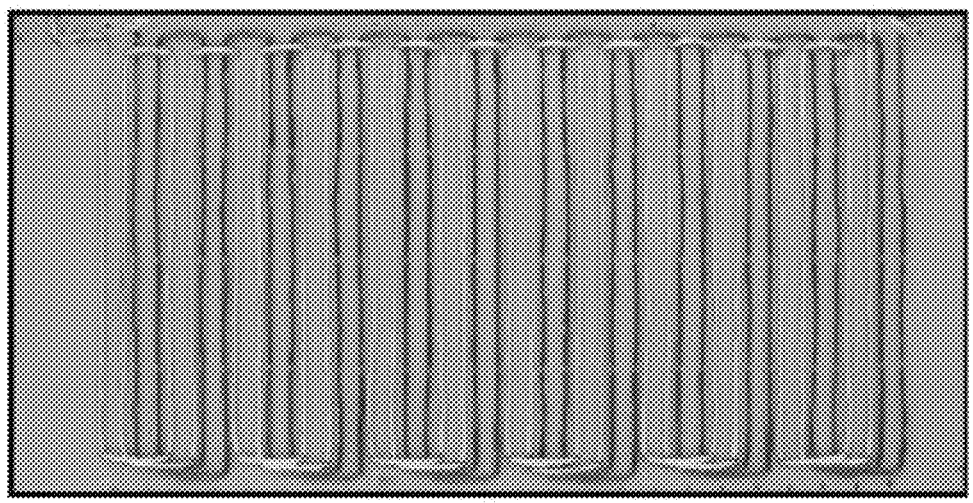
Figure 29C:
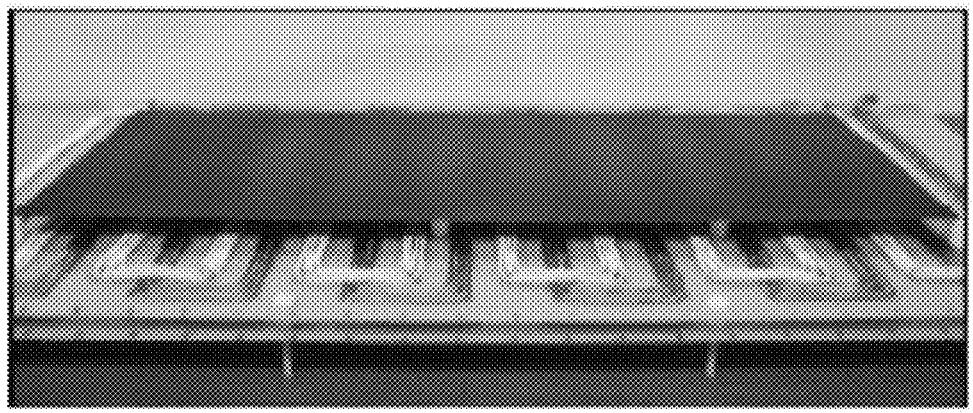

The example winding layout is based on FIG. 28 is constructed using Litz wire (175 strands×40 ga) on an 8.5"×17" G-10 board. Twelve optimized cells are used for each phase as shown in FIG. 29 to obtain a demonstrable length of uniform heating. The served Litz wire (seen as white) forms the A-phase winding while the unserved one (seen as red) forms the B-phase winding. Kevlar thread is used to keep the Litz wire in place on the G-10 board. FIG. 29A shows the top winding layer of the two phases (dark and light wires, respectively) and FIG. 29B shows the bottom winding layer of two phases. The two winding layers are assembled with a gap of 0.3 inch as shown in FIG. 29C. A steel target is shown on the top of the winding at a distance of ⅜th inch above the top layer.

Winding Excitation Using Resonant Inverter

A series resonant circuit operating at hundreds of kHz can excite the currents in an induction heating coil. The proposed two-phase (A & B) winding structure uses two resonant circuits to excite the individual phases such that the currents in the two phases are orthogonal in time. A simple approach for realizing temporally orthogonal currents in two phases is to drive the phases at same frequency but one with a sine and the other with a cosine excitation. However, because of practical winding imperfections, there is mutual coupling between the two phases, i.e. current is induced in the B-phase even when only the A-phase is energized and vice versa. The mutual coupling makes it challenging to have independent excitation control for each of the phases. Therefore, the two phases are designed to resonate at two different frequencies where the separation in tuning attenuates the effect of mutual coupling. The time orthogonality of the excitation currents is achieved on a time-averaged basis. Since the heating of the target is based on the average power dissipation, the overall excitation for the two phases at different frequencies produces uniform heating.

This section discusses the multi-resonant circuit used to drive the two phases of the winding structure. An ac analysis is performed in a lumped parameter SPICE model showing the effect of mutual coupling between the two phases when either phase is excited individually. The SPICE model will also be used to show the benefit of exciting the two phases with different frequencies even in the presence of mutual coupling. Finally, an average power transfer model is used to derive the heating pattern on the target based on the magnetic field when the individual phases are excited with different frequencies. The analytical formulation shows that the average power transfer to the target is position independent along x-direction.

A. Multi-Resonant Excitation of the Two-phase Winding

Tuning the excitations for the resonances of the two phases can be performed by measuring the terminal impedances of the prototype winding. The parameters may be measured using an impedance analyzer. The measured inductance of the A-phase is 16.12 μH while the measured inductance of the B-phase is 16.85 μH. additionally, the measured mutual inductance between the two phases is 0.71 μH. Based on these measurements, the coupling coefficient k is calculated to be only 4%.

Figure 30:
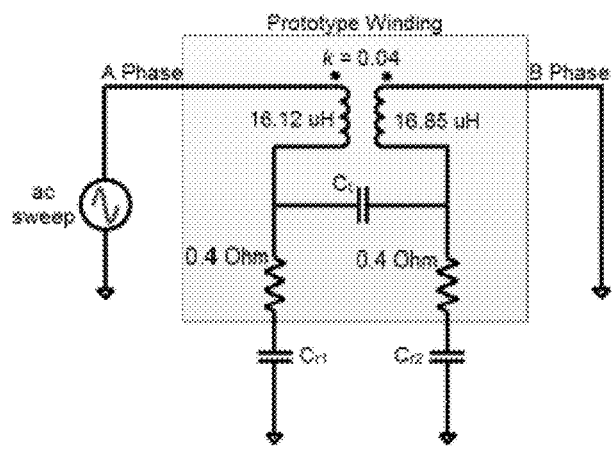
FIG. 30 shows a circuit model for driving the two-layer winding structure.
Figure 31A:
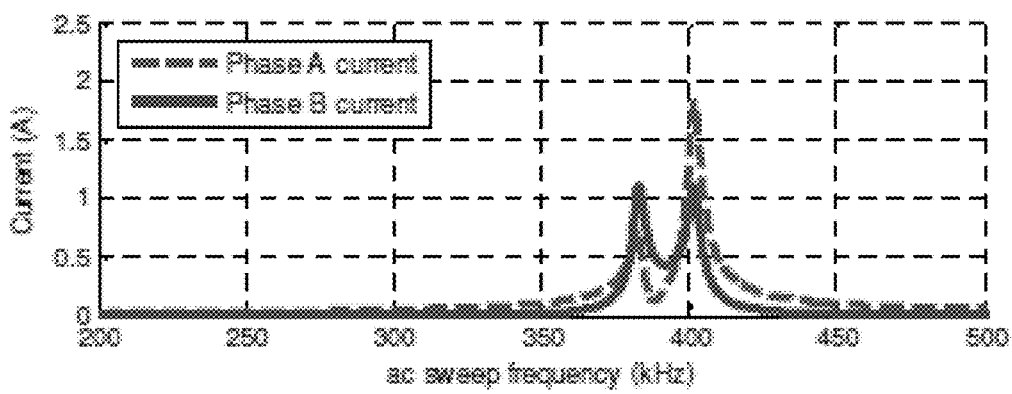
FIG. 31A shows the current response in the A and B phases for the two-layer winding structure.

To evaluate the effect of even a weak mutual coupling between the two phases on resonant excitation, a simplified lumped model of the prototype winding is used in SPICE as shown in FIG. 30. For simplicity, the distributed capacitive coupling between the two phase windings, is modeled by a single lumped capacitor Cc in this model. The windings are individually connected to two resonant capacitors Cr1 and Cr2 to form the series resonant circuits. An ac sweep is performed on the A-phase with the B-phase shorted, which is the Thevenin equivalent of a voltage source inverter. First equal resonant capacitors for the both phases is examined. For example, with Cr1=Cr2=10 nF; FIG. 31A shows the current response in the A and B phases. As expected, the A phase resonates at 400 kHz, however, significant circulating current is induced in the B-phase at the same frequency due to the mutual coupling. This shows that the A and B-phases cannot be driven independently using two separate voltage sources making it challenging to achieve temporal orthogonality in the phase excitation currents.

Figure 31B:
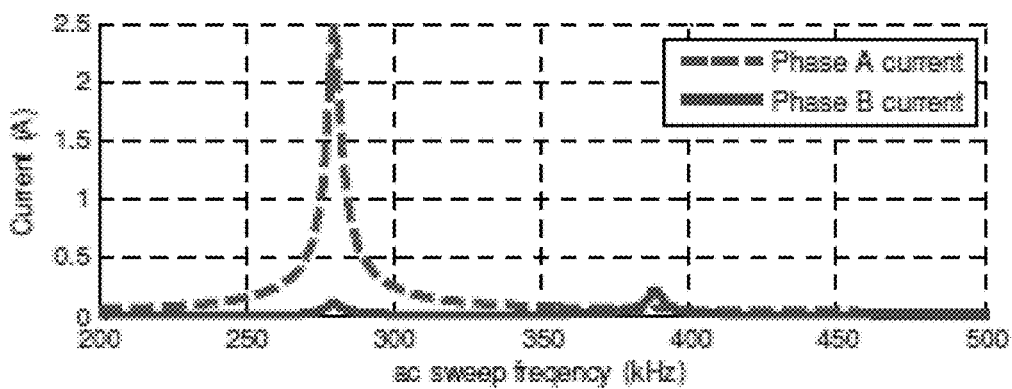
FIG. 31B shows that with the A-phase resonating at 280 kHz, the impact of cross-coupling into the B-phase is negligible.
Figure 32:
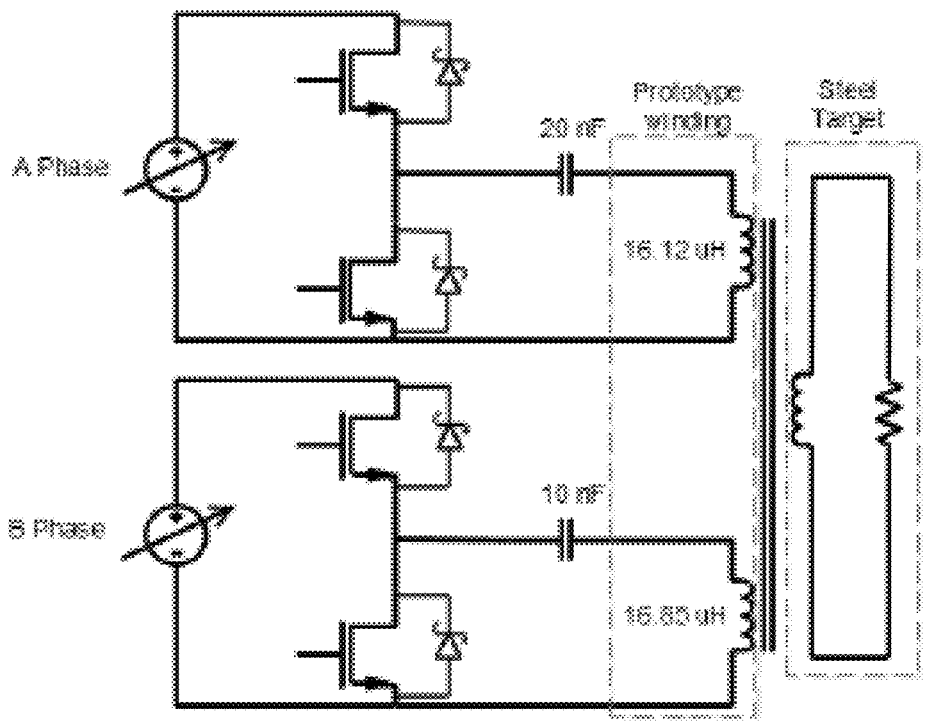
FIG. 32 shows that two independent resonant power circuits may be used to drive the prototype two-phase Halbach windings.

However, the cross coupling in the two phase currents can be significantly minimized provided the two phases are tuned to two different frequencies. For example, choosing Cr1 to be 20 nF while keeping Cr2 at 10 nF, as shown in FIG. 30, decouples the resonances between the two phases. With the A-phase resonating at 280 kHz, the impact observed in the B-phase due to the A-phase is negligible, as shown in FIG. 31B. A symmetrical analysis using an ac sweep on B phase with shorted A phase leads to an identical conclusion that the multi-resonant excitation of the two phases provides independent control of the phase currents. The multi-resonant power circuit used to excite the two phases for the prototype winding is shown in FIG. 32 FIG. 32 shows that two independent resonant power circuits may be used to drive the prototype two-phase Halbach windings. The phase A tuned resonant frequency is 280 kHz and phase B tuned resonant frequency is 387 kHz, in this example.

B. Average Power Transfer to the Target with Two Phase Winding Excited at Different Frequencies The multi-resonant excitation reduces the effect of stray coupling between the two phase windings enabling independent control of the two phases. However, the excitation directly impacts the instantaneous magnetic field produced by the individual windings. So it is worthwhile to investigate this effect on the heating pattern at the target. For example, the magnetic flux density of the fundamental spatial frequency of the A-phase at a point y above and x along a Halbach surface with height h can be shown as $$B_A = \mu_0 \alpha k N (1 - e^{-kh}) e^{-ky} I_A \cos kx \quad (7)$$

Where $k = 2\pi/\lambda$ is the radian reciprocal of the array wavelength or pole pitch, N is the equivalent number of turns, $I_A$ is the current excitation in the A-phase, and $\alpha$ is a geometric factor. Due to the orthogonal placement of the B-phase winding relative to the A-phase winding, the magnetic flux density of the B phase can be expressed as, $$B_B = \mu_0 \alpha k N (1 - e^{-kh}) e^{-ky} I_B \sin kx \quad (8)$$

Assuming the windings are identical and with individually controllable phase currents, the total magnetic flux density can be written by superposition as $$B_T = \mu_0 \alpha k N (1 - e^{-kh}) e^{-ky} [I_B \sin kx + I_A \cos kx] \quad (9)$$

The changing magnetic field due to the time-varying current excitations as computed above will result in eddy currents in the target and thereby dissipate power and heat the target. The power dissipated on the target is proportional to the square of the flux density. Thus, the instantaneous power delivered to the coil can be equivalently written as, $$P_{Target} = K_B I_B^2 \sin^2 kx + K_A I_A^2 \cos^2 kx - K_B K_A I_B I_A \sin kx \cos kx \quad (10)$$

The terms $K_A$ and $K_B$ take into account the difference in skin depths for the target at different excitation frequencies. Assuming that the current excitation in the A-phase has frequency $\omega_1$ and the current excitation in the B-phase has frequency $\omega_2$, the average power transferred to the target can be calculated as, $$\langle P_{Target} \rangle = \frac{K_B}{2} |I_B|^2 (1 - \cos 2kx) + \frac{K_A}{2} |I_A|^2 (1 + \cos 2kx) - \frac{K_A K_B}{4} \langle I_B I_A \rangle \sin 2kx \quad (11)$$

Assuming that equal power is transferred from the two phases to the target and because of the orthogonality of sinusoids with different frequencies, the average power can be simplified to, $$\langle P_{Target} \rangle = \frac{K_A}{2} |I_A|^2 + \frac{K_B}{2} |I_B|^2 \quad (12)$$

The average power transferred to the target is uniform along the x-direction enabling uniform heating on the target.

Experimental Results

The prototype winding is tested with two different experiments to verify the directionality of the magnetic field produced by the windings and the uniformity of heating that can be achieved using the two phases when excited with the two resonant power circuits. The target used is made of steel of thickness 5 mil and of dimension 12 inch by 7 inch.

Figure 33:
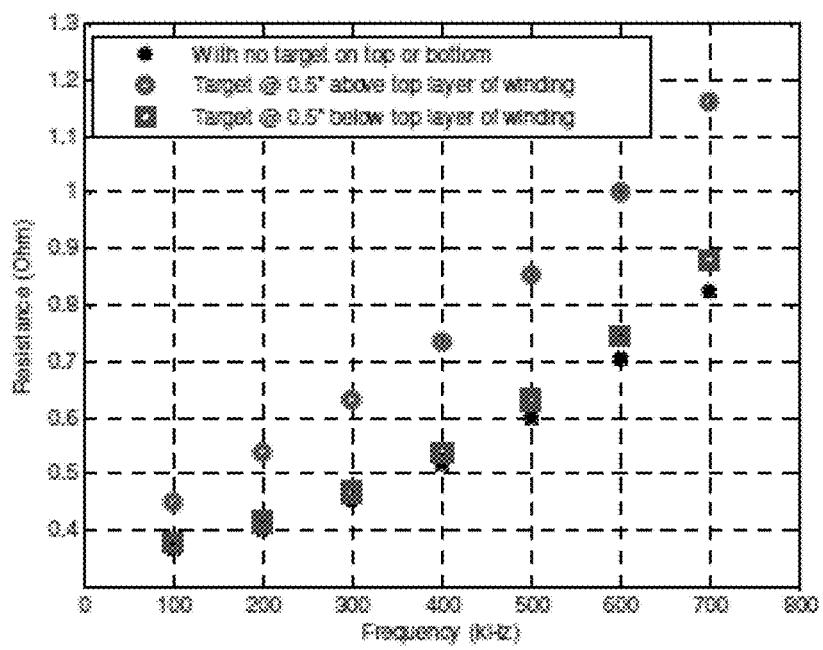
FIG. 33 shows a plot of the resistance of the A-phase winding as a function of excitation frequency.

A. Change in Effective Resistance of the Winding Due to the Proximity of the Target The prototype winding as shown in FIG. 29 is tested for performance in terms of directionality using an impedance analyzer. The resistance of the A-phase winding is measured as a function of excitation frequency and plotted in FIG. 33. The change in the terminal resistance of the two-layer A-phase winding is much higher when the target is above than an equidistant 0.5 inch below. The difference in the loading effect shows strongly asymmetric magnetic coupling to the target between the top and the bottom, which is expected from a Halbach winding.

B. Thermal Performance of the Proposed Induction Heater

Figure 34A:
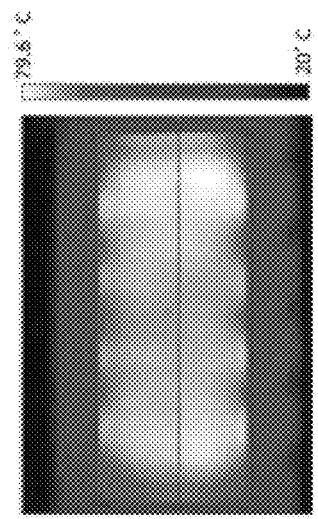
FIGS. 34A and 34B show the non-uniform heating of the target when only the A or B phase is individually excited, respectively.
Figure 34B:
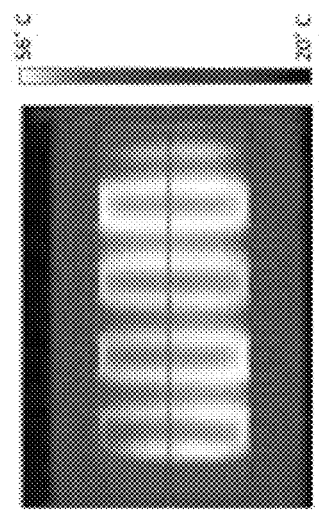
Figure 34C:
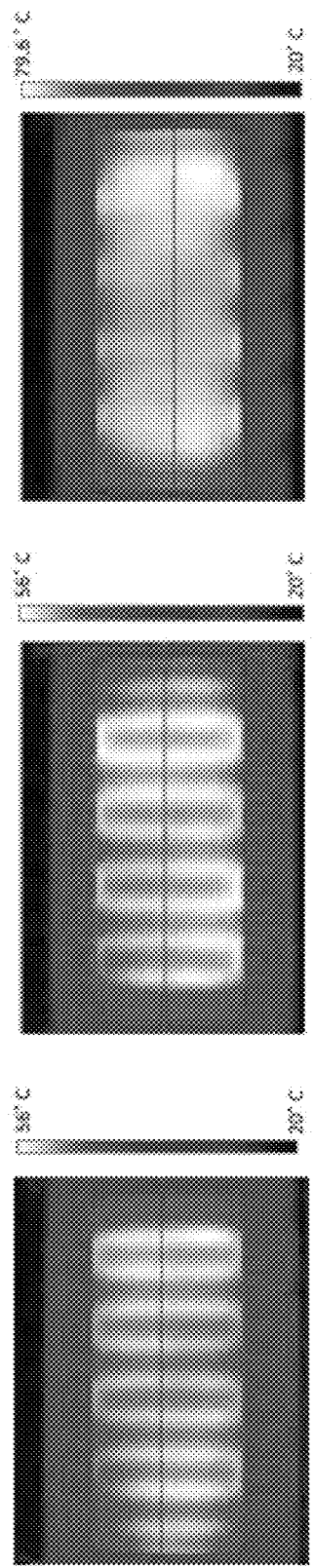
FIG. 34C shows the uniform heating along the surface of the target when both the phases are excited together.
Figure 36:
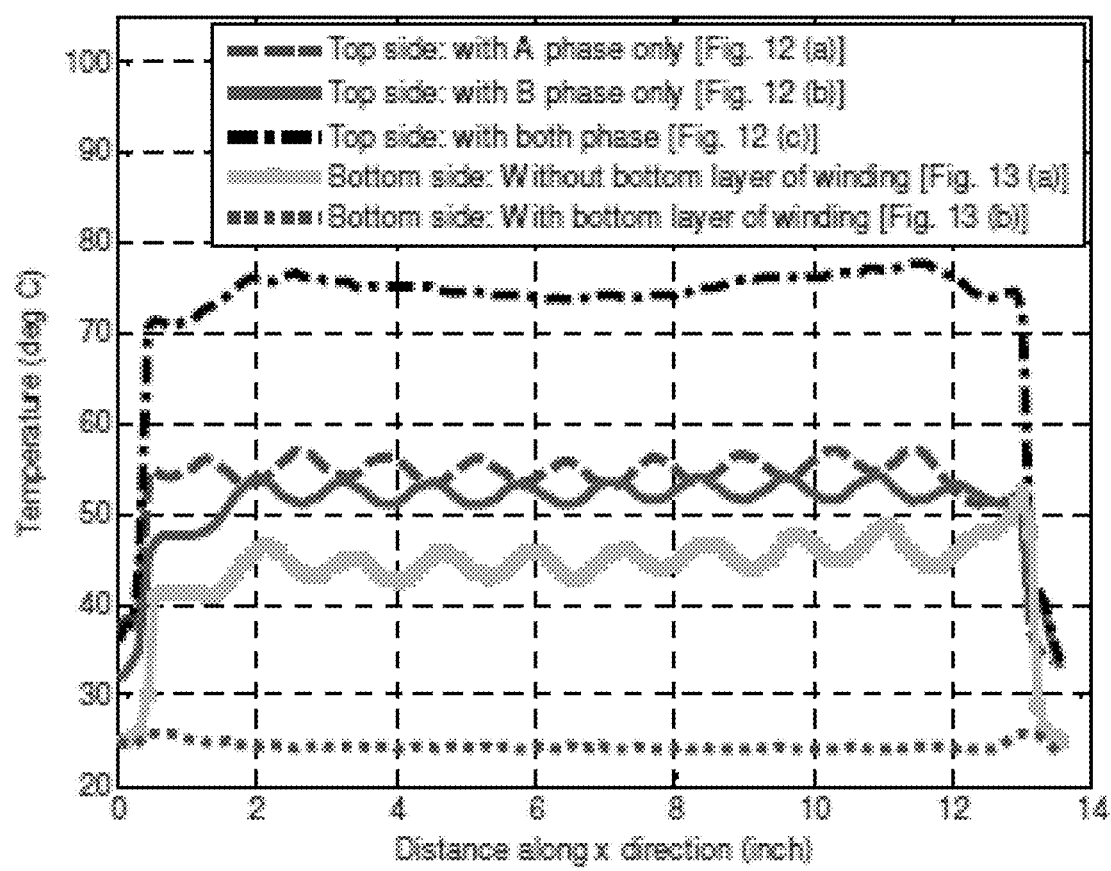
FIG. 36 shows a temperature profile at front side and back side target locations by exciting the phases individually and in combination.
Figure 37:
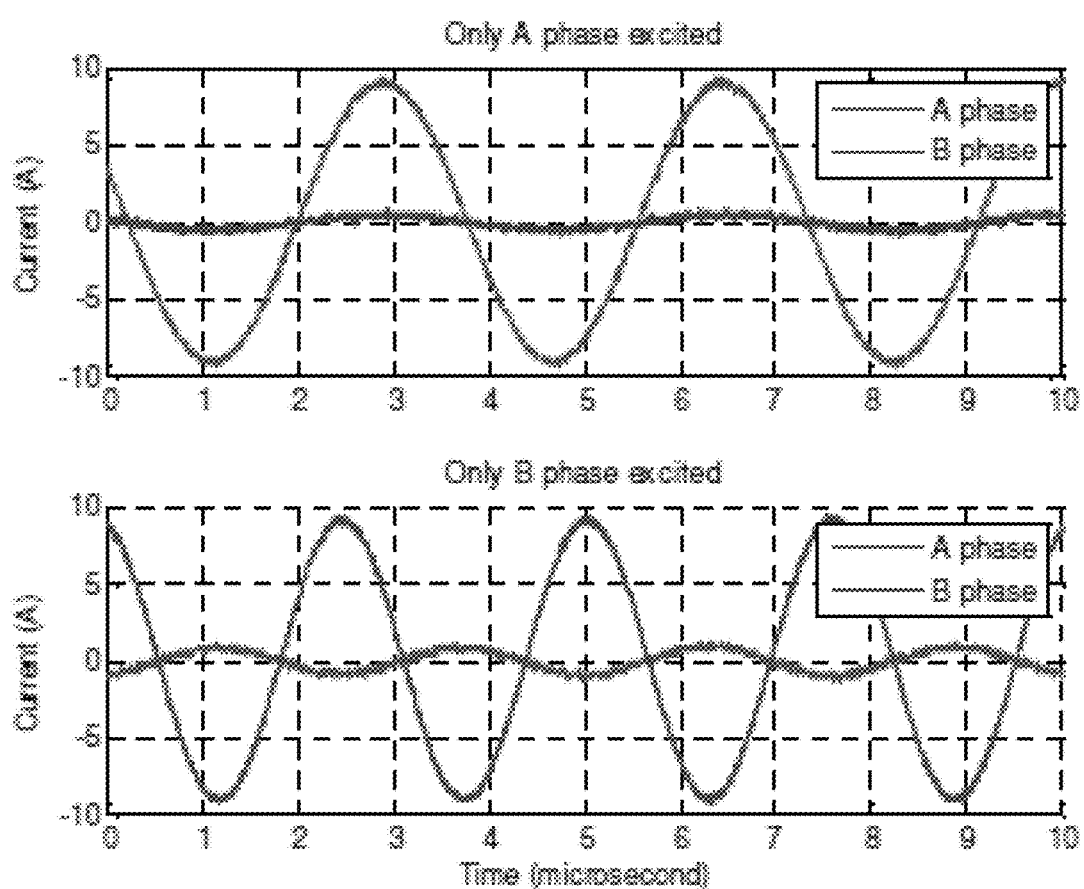
FIG. 37 shows measured current of the A phase and the B phase when excited individually.

The prototype windings are excited using two resonant inverters with the steel target at ⅜" from the top layer of the winding. The surface of the target is coated with a black thermal coating (emissivity=0.97) for proper thermal imaging and a Fluke TI20 camera is used to capture the thermal images of the target. The thermal images obtained are shown in FIG. 34A-C and FIG. 35A-B and the temperature profiles are compared in FIG. 36 along the center horizontal guide lines (X dimension) shown in the thermal images. FIGS. 34A and 34B show the non-uniform heating of the target when only the A or B phase is individually excited, respectively. FIG. 34C shows the uniform heating along the surface of the target when both the phases are excited together. FIG. 37 shows measured current of the A phase and the B phase when excited individually. FIG. 37 shows minimal cross coupling of the phase currents because two different resonant frequencies are used for each of the two phases. The pattern has a periodicity of 2kx and is shifted by 180° in space as expected due to the flux density pattern of the individual phases. Fringing effects of the magnetic field at the end of the windings cause in non-uniform heating at the edges.

Figure 35A:
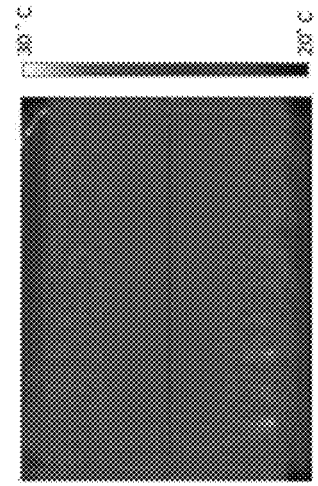
FIG. 35A shows heating of a target on the bottom side of the winding structure when only a single phase is excited.
Figure 35B:
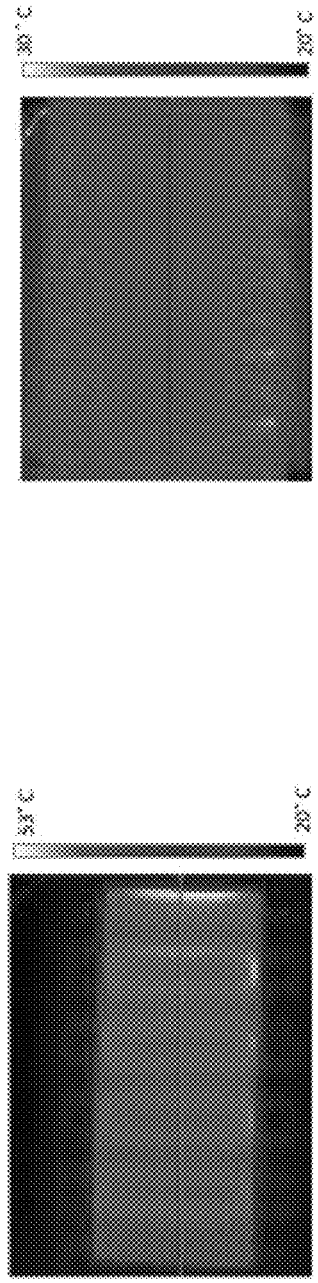
FIG. 35B shows no heating of the bottom target when both phases are excited.

With uniform heating obtained on top, another identical target is then placed on the back of the winding at a distance 0.4 inch from the top winding layer to evaluate the directionality of the heating. The A-phase is first excited with a disconnected bottom layer. As the inductance of the winding changes due to the removal of bottom layer connection, the resonant frequency is adjusted so that the A-phase still resonates with 20 nF. An average temperature rise of 45° C., shown in FIG. 36, is observed on the bottom target while the thermal profile is similar to the top because of single phase excitation as shown in FIG. 35A. Re-connecting the bottom layer results in no heating of the bottom target as shown in thermal image of FIG. 35B as well as on the temperature profile in FIG. 36. The thermal image only shows heating up of the winding relative to the bottom target. This validates that the optimized winding behaves as a Halbach array providing both single side and uniform heating.

ADDITIONAL ASPECTS

Various aspects of the apparatus and techniques described herein may be used alone, in combination, or in a variety of arrangements not specifically discussed in the embodiments described in the foregoing description and is therefore not limited in its application to the details and arrangement of components set forth in the foregoing description or illustrated in the drawings. For example, aspects described in one embodiment may be combined in any manner with aspects described in other embodiments.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items. For example, an apparatus, structure, device, layer, or region recited as "including," "comprising," or "having," "containing," "involving," a particular material is meant to encompass at least the material listed and any other elements or materials that may be present.

What is claimed is:

1. A system for generating an asymmetric magnetic field, the system comprising:
    a drive circuit; and
    a stacked winding structure coupled to the drive circuit, the stacked winding structure comprising a plurality of winding layers, the plurality of winding layers comprising:
        a first winding layer including a first conductive winding having first turns; and
        a second winding layer including a second conductive winding having second turns,
    wherein the plurality of winding layers is arranged to produce a first magnetic field at a first side of the stacked winding structure and a second magnetic field at a second side of the stacked winding structure when the drive circuit electrically drives the plurality of winding layers, wherein the first magnetic field is greater than the second magnetic field,
    wherein the first winding layer further comprises a third conductive winding having third turns,
    wherein the drive circuit is configured to electrically drive the first conductive winding at a first frequency and to electrically drive the third conductive winding at a second frequency different from the first frequency.

2. The system of claim 1, wherein the first turns are positioned at periodic spatial intervals along a first spatial dimension.

3. The system of claim 1, wherein the second turns are positioned at periodic spatial intervals along a first spatial dimension.

4. The system of claim 1, wherein the stacked winding structure comprises two winding layers and no more than two winding layers.

5. The system of claim 1, further comprising a third winding layer.

6. The system of claim 5, wherein the stacked winding structure comprises three winding layers and no more than three winding layers.

7. The system of claim 1, wherein the plurality of winding layers is arranged in a Halbach configuration.

8. The system of claim 1, wherein the first turns and the third turns are positioned at periodic spatial intervals along a first spatial dimension, wherein the third turns are spatially shifted with respect to the first turns by a first distance along a first spatial dimension.

9. The system of claim 8, wherein the second winding layer further comprises a fourth winding having fourth turns.

10. The system of claim 9, wherein the second turns and the fourth turns are positioned at periodic spatial intervals along the first spatial dimension, wherein the fourth turns are spatially shifted with respect to the second turns by a second distance along the first spatial dimension.

11. The system of claim 10, wherein the second distance is ¼ of a spatial period of the second turns along the first spatial dimension.

12. The system of claim 1, wherein the first frequency and the second frequency are selected to avoid magnetic cross-coupling between the first and third conductive windings.

13. The system of claim 1, wherein the second winding layer further comprises a fourth winding having fourth turns, and wherein the drive circuit is configured to electrically drive the second conductive winding at the first frequency and to electrically drive the fourth conductive winding at the second frequency.

14. The system of claim 1, wherein the plurality of winding layers is arranged to produce the first magnetic field and the second magnetic field such that a first magnetic energy transferred to the first side of the stacked winding structure is greater than a second magnetic energy transferred to the second side of the stacked winding structure.

15. The system of claim 14, wherein a ratio of the first magnetic energy to the second magnetic energy is at least five.

16. The system of claim 1, wherein the stacked winding structure is configured to produce a uniform magnetic field at the first side of the stacked winding structure.

17. The system of claim 1, wherein the system is configured to perform induction heating or wireless power transfer at the first side of the stacked winding structure.

18. The system of claim 1, wherein the first winding layer is planar and the second winding layer is planar.

19. A system for generating an asymmetric magnetic field, the system comprising:
    a drive circuit; and
    a stacked winding structure coupled to the drive circuit, the stacked winding structure comprising a plurality of winding layers, the plurality of winding layers comprising:
        a first winding layer including a first conductive winding having first turns; and
        a second winding layer including a second conductive winding having second turns,
    wherein the plurality of winding layers is arranged to produce a first magnetic field at a first side of the stacked winding structure and a second magnetic field at a second side of the stacked winding structure when the drive circuit electrically drives the plurality of winding layers, wherein the first magnetic field is greater than the second magnetic field,
    wherein the first winding layer further comprises a third conductive winding having third turns,
    wherein the first turns and the third turns are positioned at periodic spatial intervals along a first spatial dimension, wherein the third turns are spatially shifted with respect to the first turns by a first distance along a first spatial dimension,
    wherein the first distance is ¼ of a spatial period of the first turns along the first spatial dimension.

20. A system for generating an asymmetric magnetic field, the system comprising:
    a drive circuit; and a stacked winding structure coupled to the drive circuit, the stacked winding structure comprising a plurality of winding layers, the plurality of winding layers comprising:
  a first winding layer including a first conductive winding having first turns; and
  a second winding layer including a second conductive winding having second turns,
  wherein the plurality of winding layers is arranged to produce a first magnetic field at a first side of the stacked winding structure and a second magnetic field at a second side of the stacked winding structure when the drive circuit electrically drives the plurality of winding layers, wherein the first magnetic field is greater than the second magnetic field,
  wherein the drive circuit comprises at least one inverter,
  wherein the at least one inverter comprises a plurality of inverters driving the plurality of winding layers at different frequencies, wherein the plurality of inverters includes a first inverter coupled to the first conductive winding, wherein the first winding layer includes a third conductive winding, and wherein the plurality of inverters includes a second inverter coupled to the third conductive winding.

21. The system of claim 20, wherein the at least one inverter comprises at least one resonant inverter.

22. A stacked winding structure for producing an asymmetric magnetic field, the stacked winding structure comprising a plurality of winding layers, the stacked winding structure comprising:
  a substrate having a surface; and
  a plurality of winding layers comprising:
    a first winding layer including a first conductive winding having first turns, respective turns of the first turns being displaced from one another in a direction extending along the surface of the substrate; and
    a second winding layer including a second conductive winding having second turns, respective turns of the second turns being displaced from one another in a direction extending along the surface of the substrate,
  wherein the plurality of winding layers is arranged to produce a first magnetic field at a first side of the substrate and a second magnetic field at a second side of the substrate when a current is provided to the plurality of winding layers, wherein the first magnetic field is greater than the second magnetic field.

23. The stacked winding structure of claim 22, wherein the first turns are positioned at periodic spatial intervals along the direction and the second turns are positioned at periodic spatial intervals along the direction.

24. The stacked winding structure of claim 22, wherein the plurality of winding layers is arranged in a Halbach configuration.

25. The stacked winding structure of claim 22, wherein the first winding layer is planar and the second winding layer is planar.

26. The stacked winding structure of claim 22, wherein respective turns of the first turns are not concentric with one another.

27. A method of producing an asymmetric magnetic field using a stacked winding structure comprising a substrate and plurality of winding layers, the plurality of winding layers comprising a first winding layer including a first conductive winding having first turns, respective turns of the first turns being displaced from one another in a direction extending along a surface of the substrate, and a second winding layer including a second conductive winding having second turns, respective turns of the second turns being displaced from one another in a direction extending along the surface of the substrate, the plurality of winding layers being arranged to produce a first magnetic field at a first side of the substrate and a second magnetic field at a second side of the substrate, the first magnetic field being greater than the second magnetic field, the method comprising:
  driving a current through the plurality of winding layers to magnetically transfer energy to the first side of the substrate.

28. The method of claim 27, wherein the method performs induction heating of an object positioned to the first side of the stacked winding structure or wireless energy transfer to a device positioned to the first side of the stacked winding structure.

* * * * *